(12) United States Patent
Shin

(10) Patent No.: US 11,688,397 B2
(45) Date of Patent: Jun. 27, 2023

(54) ELECTRONIC APPARATUS AND METHOD OF CONTROLLING THE SAME

(71) Applicant: SAMSUNG ELECTRONICS CO., LTD., Suwon-si (KR)

(72) Inventor: Ki Hoon Shin, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 166 days.

(21) Appl. No.: 17/142,688

(22) Filed: Jan. 6, 2021

(65) Prior Publication Data
US 2021/0241764 A1    Aug. 5, 2021

(30) Foreign Application Priority Data

Jan. 30, 2020  (KR) .................. 10-2020-0011108

(51) Int. Cl.
*G10L 15/22*     (2006.01)
*G10L 15/26*     (2006.01)
*G10L 15/30*     (2013.01)

(52) U.S. Cl.
CPC .............. *G10L 15/22* (2013.01); *G10L 15/26* (2013.01); *G10L 15/30* (2013.01); *G10L 2015/223* (2013.01)

(58) Field of Classification Search
CPC .......... G10L 15/22; G10L 15/26; G10L 15/30
See application file for complete search history.

(56) References Cited

U.S. PATENT DOCUMENTS

| | | |
|---|---|---|
| 2017/0245076 A1 | 8/2017 | Kusano et al. |
| 2018/0204331 A1* | 7/2018 | Omari .................... B64D 47/08 |
| 2019/0089550 A1* | 3/2019 | Rexach .................... E03C 1/057 |

FOREIGN PATENT DOCUMENTS

| | | |
|---|---|---|
| EP | 3457227 | 3/2019 |
| EP | 3 474 557 | 4/2019 |

OTHER PUBLICATIONS

European Search Report and Written Opinion dated Jul. 2, 2021 in corresponding European Application No. 21151396.5.
European Office Action dated Dec. 22, 2022 for EP Application No. 21 151 396.5.

\* cited by examiner

*Primary Examiner* — Ibrahim Siddo
(74) *Attorney, Agent, or Firm* — Nixon & Vanderhye P.C.

(57) ABSTRACT

Disclosed are an electronic apparatus and a method of controlling the same, the electronic apparatus including: interface circuitry; and a processor configured to control the electronic apparatus to: transmit information of a received voice command and information of an apparatus corresponding to the voice command to a sever through the interface circuitry, receive a response message to the voice command, the response message including a type corresponding to the apparatus among a plurality of types, from the server through the interface circuitry, and output the received response message through the electronic apparatus.

20 Claims, 11 Drawing Sheets

ELECTRONIC APPARATUS AND METHOD OF CONTROLLING THE SAME

CROSS-REFERENCE TO RELATED APPLICATION

This application is based on and claims priority under 35 U.S.C. § 119 to Korean Patent Application No. 10-2020-0011108, filed on Jan. 30, 2020 in the Korean Intellectual Property Office, the disclosure of which is incorporated by reference herein in its entirety.

BACKGROUND

Field

The disclosure relates to an electronic apparatus and a method of controlling the same, and for example to an electronic apparatus, which performs an operation corresponding to a user's voice command, and a method of controlling the same.

Description of Related Art

With development of electronic technology, various types of electronic products are being developed and spread. For example, use of various electronic apparatuses such as a smartphone, a tablet computer, a personal computer (PC) or the like terminal, home appliances, etc. is gradually expanding.

As the use of the electronic apparatuses increases, a user's needs for more various functions have also been increased. Accordingly, manufacturers are trying to meet the user's needs, and thus successively release products with new functions which conventional products did not have before.

At home, many electronic apparatuses such as a television (TV), a refrigerator, a washing machine, an air conditioner and the like home appliances as well as terminal apparatuses are used, and a home network system for connecting and controlling such electronic apparatuses through a network has become commercialized.

Such a home network system is able to support a voice recognition function, so that a user can utter a voice command to thereby make a desired operation be performed by a corresponding electronic apparatus.

SUMMARY

Embodiments of the disclosure provide an electronic apparatus, which can control a plurality of electronic apparatuses based on a voice command uttered by a user, and a method of controlling the same.

According to an example embodiment of the disclosure, an electronic apparatus includes: interface circuitry; and a processor configured to control the electronic apparatus to: transmit information of a received voice command and information of an apparatus corresponding to the voice command to a sever through the interface circuitry, receive a response message to the voice command the response message including a type corresponding to the apparatus among a plurality of types from the server through the interface circuitry, and to output the received response message.

The processor may be configured to designate the electronic apparatus among the electronic apparatus and at least one external apparatus connectable through the interface circuitry as a representative apparatus.

The processor may be configured to designate the representative apparatus based on an input.

The processor may be configured to designate the representative apparatus based on a graphic user interface (GUI) displayed on a display.

The processor may be configured to designate the representative apparatus in each of at least one area.

The processor may be configured to activate a microphone of the representative apparatus and inactivate a microphone of other apparatuses.

The processor may be configured to control the electronic apparatus to receive the voice command through the activated microphone.

A type of the response message may correspond a message output type of the apparatus corresponding to the voice command.

The processor may be configured to further control the electronic apparatus to: receive a control instruction corresponding to the voice command from the server, and transmit the received control instruction to a target apparatus of the voice command through the interface circuitry.

The control instruction may include a control instruction for an apparatus matching a category classified by a user's intention based on a recognition result from speech-to-text (STT) conversion of the received voice command.

The processor may be configured to control the electronic apparatus to: obtain a text based on the STT conversion of the received voice signal and transmit the obtained text to the server.

The processor may be configured to control the electronic apparatus to: receive information informing that the electronic apparatus among the electronic apparatus and at least one external apparatus is designated as a representative apparatus, from an external apparatus through the interface circuitry.

According to an example embodiment of the disclosure, a method of controlling an electronic apparatus, includes: transmitting information of a received voice command and information of an apparatus corresponding to the voice command to a sever through interface circuitry; receiving a response message to the voice command including a type corresponding to the apparatus among a plurality of types from the server through the interface circuitry, and controlling the received response message to be output through the electronic apparatus.

The method may further include designating the electronic apparatus among the electronic apparatus and at least one external apparatus connectable through the interface circuitry as a representative apparatus.

The designating the electronic apparatus as the representative apparatus may be performed based on an input or a graphic user interface (GUI) displayed on a display.

The designating the electronic apparatus as the representative apparatus may include designating the representative apparatus in each of at least one area.

The method may further include activating a microphone of the representative apparatus and inactivating a microphone of other apparatuses, and the voice command may be received through the activated microphone.

A type of the response message may correspond a message output type of the apparatus corresponding to the voice command.

The method may further include receiving a control instruction corresponding to the voice command from the server; and transmitting the received control instruction to a target apparatus of the voice command through the interface circuitry.

The control instruction may include a control instruction for an apparatus matching a category classified by a user's intention based on a recognition result from speech-to-text (STT) conversion of the received voice command.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
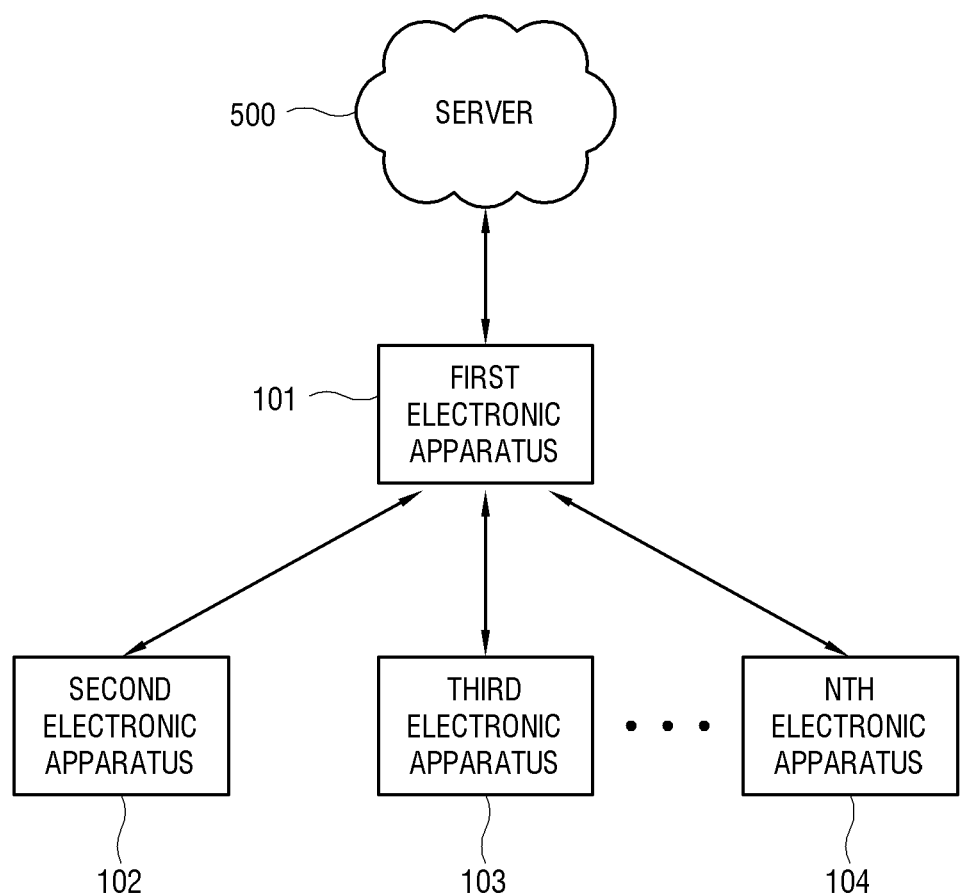
FIG. 1 is a diagram illustrating an example voice recognition system according to various embodiments.

Below, various example embodiments will be described in greater detail with reference to accompanying drawings. In the drawings, like numerals or symbols refer to like elements having substantially the same function, and the size of each element may be exaggerated for clarity and convenience of description. However, the configurations and functions illustrated in the following example embodiments do not limit the disclosure and the described configurations and functions. In the following descriptions, details about publicly known functions or features may be omitted if it is determined that they cloud the gist of the disclosure.

In the following example embodiments, terms 'first', 'second', etc. are used simply to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements may refer to not only all the plurality of elements but also both each one of the plurality of elements excluding the other elements and a combination thereof.

Embodiments of the disclosure provide an electronic apparatus, which can control a plurality of electronic apparatuses based on a voice command uttered by a user, and a method of is a diagram illustrating an example voice recognition system according to various embodiments.

According to an embodiment, a voice recognition system 1 may include a plurality of electronic apparatuses 101, 102, 103 and 104, and a server 500.

The plurality of electronic apparatuses 101, 102, 103 and 104 may refer, for example, to apparatuses which make up a home network system, and may for example include a television (TV), an air conditioner, a washing machine, a refrigerator and the like home appliances. Further, the plurality of electronic apparatuses 101, 102, 103 and 104 may include various kinds of electronic apparatuses provided as things or smart things for example, for healthcare, remote meter reading, smart home, smart car, and the like Internet of things (IoT)-based operations.

The plurality of electronic apparatuses 101, 102, 103 and 104 may be connected by predetermined standardized protocols, for example, Wi-Fi, Bluetooth, Zigbee, ultra-wideband (UWB), near field communication (NFC), Ethernet, etc. to perform wired or wireless network communication.

The plurality of electronic apparatuses 101, 102, 103 and 104 may operate based on a voice command uttered by a user. For example, the plurality of electronic apparatuses 101, 102, 103 and 104 may operate based on a control instruction provided from the server 500 corresponding to a user's voice command.

According to an embodiment, at least one among the plurality of electronic apparatuses 101, 102, 103 and 104 may include a microphone as a voice receiver capable of receiving a voice command uttered by a user.

The server 500 may perform communication with at least one among the plurality of electronic apparatuses 101, 102, 103 and 104.

According to an embodiment, the server 500 may, as illustrated in FIG. 1, perform communication with a first electronic apparatus 101 among the plurality of electronic apparatuses 101, 102, 103 and 104.

The first electronic apparatus 101 may be designated as a representative apparatus, and receive a voice command targeted for any one among the electronic apparatuses 102, 103 and 104 other than the first electronic apparatus 101.

The first electronic apparatus 101 designated as the representative apparatus may serve as a master apparatus that receives a voice command through a microphone (see 140 in FIG. 5), and other electronic apparatuses 102, 103 and 104 may serve as a slave apparatus. However, these terms are merely used to conveniently distinguish between the apparatuses according to their roles, and the functions of the apparatuses are not limited by the terms of the apparatuses.

In the voice recognition system 1 according to an embodiment, such electronic apparatuses 101, 102, 103 and 104 may be grouped into the master apparatus or the slave apparatus, thereby receiving a voice command and performing a control operation corresponding to the received voice command. In other words, the master apparatus may be regarded as a representative that is in command of the slave apparatus.

According to an embodiment, the representative apparatus, in other words, the first electronic apparatus 101 designated as the master apparatus may be configured to store and manage information about the electronic apparatuses 102, 103 and 104 corresponding to the slave apparatuses. For example, the storage (refer, for example, to '160' in FIG. 5) of the first electronic apparatus 101 may be configured to store identification (ID) information of a second electronic apparatus 102, the third electronic apparatus 103, . . . , the Nth electronic apparatus 104. The storage (refer, for example, to '160' in FIG. 5) of the first electronic apparatus 101 may be configured to store a list of grouped apparatuses, e.g., an apparatus list including identification information of the master apparatus, e.g., the first electronic apparatus 101 and the slave apparatuses grouped with the master apparatus, e.g., the second electronic apparatus 102, the third electronic apparatus 103, . . . , the Nth electronic apparatus 104.

Further, a microphone 140 (refer to FIG. 5) of the first electronic apparatus 101 designated as the master apparatus may be activated, but microphones of the slave apparatus, e.g., the electronic apparatuses 102, 103 and 104 other than the first electronic apparatus 101 are inactivated. The activation may include turning on the microphone 140, and the inactivation may include turning of the microphone 140.

A voice command targeted for not only the master apparatus but also the slave apparatus is receivable through the microphone of the first electronic apparatus 101. A voice command targeted for the slave apparatus having no microphone is also receivable through the microphone of the first electronic apparatus 101.

When the first electronic apparatus 101 designated as the master apparatus receives a voice command, the first electronic apparatus 101 may identify a target apparatus corresponding to the voice command among the plurality of electronic apparatuses 101, 102, 103 and 104 including the master apparatus and the slave apparatuses. The first electronic apparatus 101 may transmit information about the received voice command to the server 500.

The first electronic apparatus 101 may receive a response signal (or response data) generated corresponding to the voice command from the server 500.

According to an embodiment, the response signal may include a response message and a control instruction for the target apparatus. The first electronic apparatus 101 may extract the response message and the control instruction from the response signal received from the server 500, and identify the target apparatus with respect to the control instruction. The response message and the control instruction may be received together as a predetermined format, or may be received separately as necessary.

The first electronic apparatus 101 may autonomously perform an operation corresponding to the control instruction based on an identification result, or transmit the control instruction to one of other electronic apparatuses 102, 103 and 104.

According to an embodiment, the representative apparatus may be designated based on at least one space of the voice recognition system 1, in other words, according to regions or areas.

Figure 2:
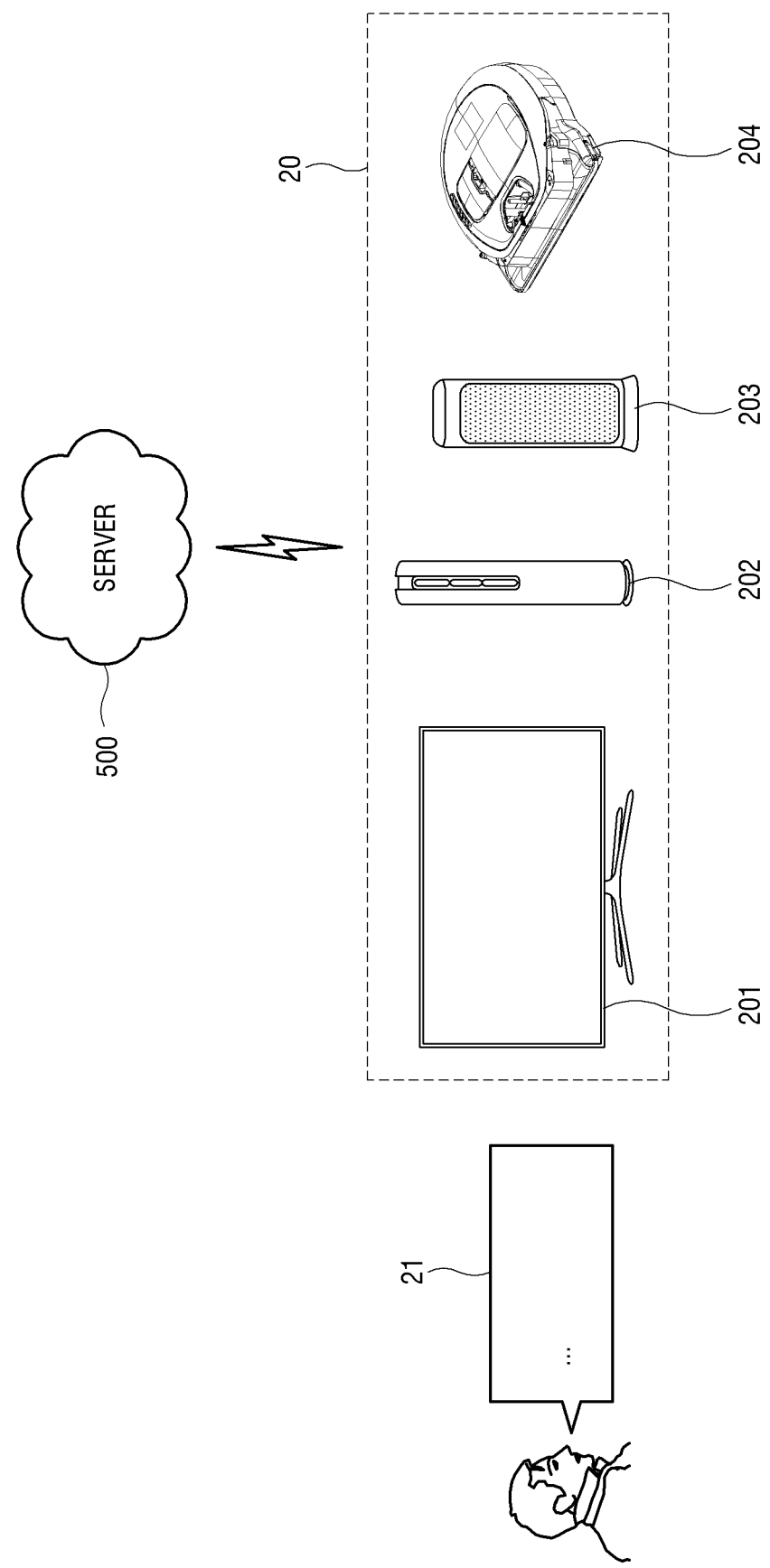
FIG. 2 is a diagram illustrating example electronic apparatuses in a first area, which make up a voice recognition system according to various embodiments.
Figure 3:
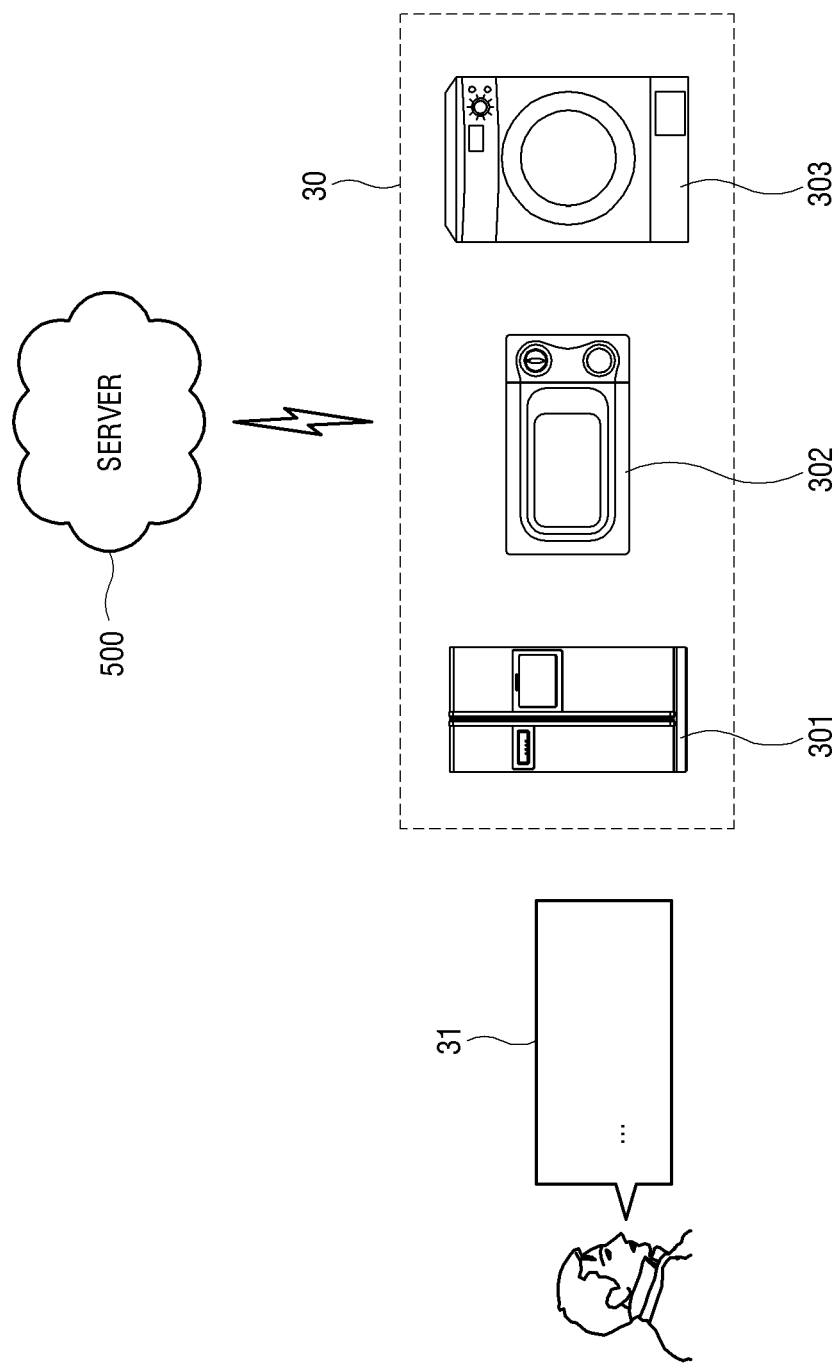
FIG. 3 is a diagram illustrating example electronic apparatuses in a second area, which make up a voice recognition system according to various embodiments.

FIG. 2 is a diagram illustrating example electronic apparatuses in a first area, which make up a voice recognition system according to various embodiments, and FIG. 3 is a diagram illustrating example electronic apparatuses in a second area, which make up a voice recognition system according to various embodiments.

According to an embodiment, the voice recognition system may, as illustrated in FIG. 2, include a plurality of electronic apparatuses 201, 202, 203 and 204 placed in a first area 20, for example, a living room at home.

FIG. 2 illustrates an example in which the plurality of electronic apparatuses 201, 202, 203 and 204 correspond to a TV, an air conditioner, an air cleaner, and a cleaning robot, respectively. However, the electronic apparatuses 201, 202, 203 and 204 are not limited to the given example, and may additionally include or exclude at least one electronic apparatus.

According to an embodiment, one, for example, the TV 201, among the plurality of electronic apparatuses 201, 202, 203 and 204 placed in the first area 20, in other words, the living room, may be designated as the representative apparatus, in other words, the master apparatus.

The TV 201 designated as the master apparatus may receive a voice command 21 uttered by a user through its own microphone or a microphone provided in a remote controller. The received voice command 21 may be targeted for one among the plurality of electronic apparatuses 201, 202, 203 and 204 including the master apparatus and the slave apparatus.

According to an embodiment, the voice recognition system 1 may, as illustrated in FIG. 3, include a plurality of electronic apparatuses 301, 302 and 303 placed in a second area 30, for example, a kitchen at home.

FIG. 3 illustrates an example in which the plurality of electronic apparatuses 301, 302 and 303 correspond to a refrigerator, a microwave oven, and a washing machine, respectively. However, the electronic apparatuses 301, 302 and 303 are not limited to the given example, and may additionally include or exclude at least one electronic apparatus.

According to an embodiment, one, for example, the refrigerator 301, among the plurality of electronic apparatuses 301, 302 and 303 placed in the second area 30, in other words, the kitchen, may be designated as the representative apparatus, in other words, the master apparatus.

The refrigerator 301 designated as the master apparatus may receive a voice command 31 uttered by a user through its own microphone. The received voice command 31 may be targeted for one among the plurality of electronic apparatuses 301, 302 and 303 including the master apparatus and the slave apparatus.

Figure 4:
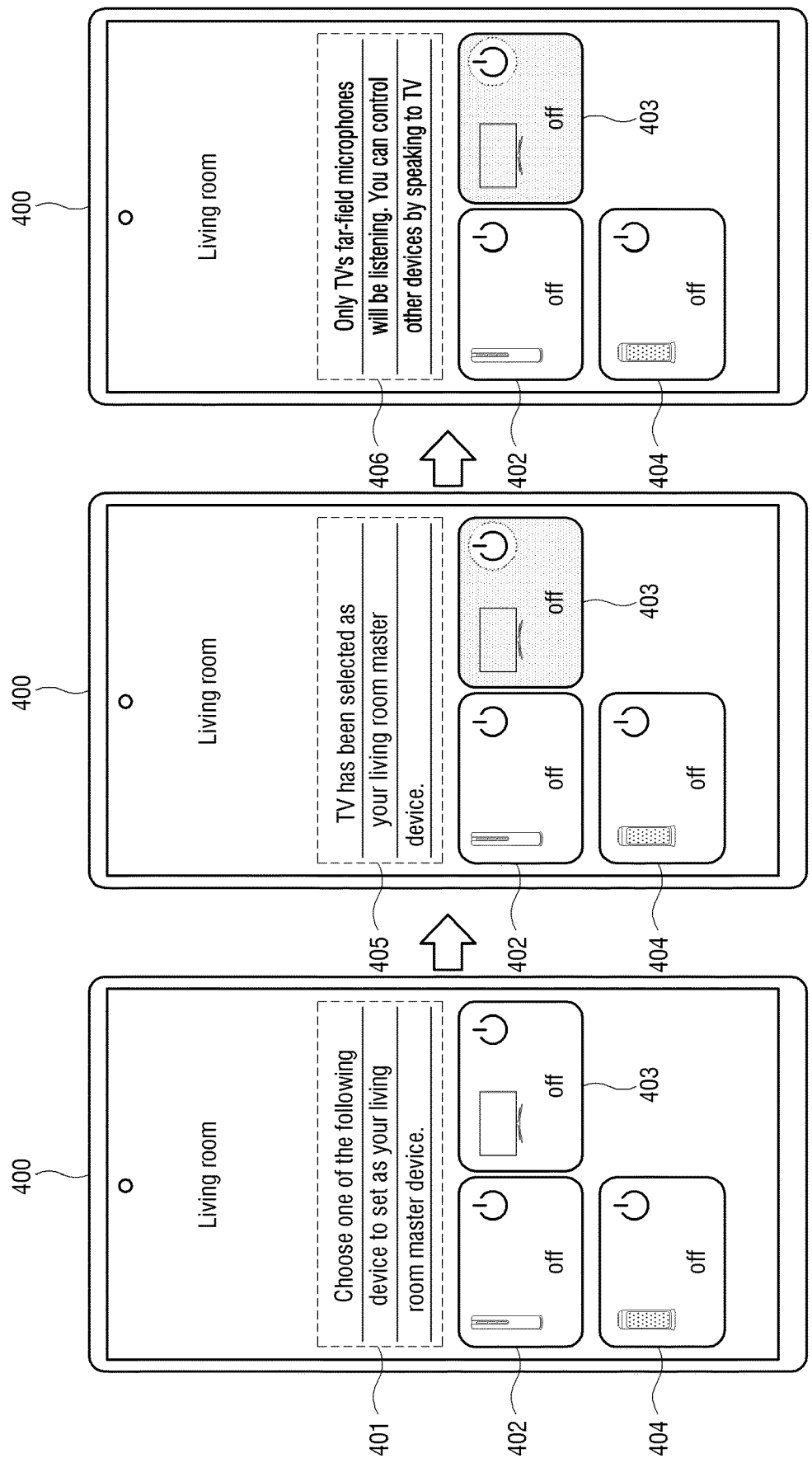
FIG. 4 is a diagram illustrating an example process of designating a representative apparatus among a plurality of electronic apparatuses according to various embodiments.

FIG. 4 is a diagram illustrating an example process of designating a representative apparatus among a plurality of electronic apparatuses according to various embodiments.

According to an embodiment, a user may use a terminal apparatus 400 as an external apparatus capable of communicating with the plurality of electronic apparatuses 101, 102, 103 and 104 to designate one among the plurality of electronic apparatuses 101, 102, 103 and 104 as the representative apparatus, in other words, the master apparatus.

The terminal apparatus 400 may be embodied, for example, and without limitation, by a smartphone, a tablet computer, a smart pad, a smart watch, a portable media player, or the like mobile apparatus. However, there are no limits to the embodiment of the terminal apparatus 400 according to the disclosure, and the terminal apparatus 400 may be embodied by various apparatuses capable of communicating with the plurality of electronic apparatuses 101, 102, 103 and 104, for example, and without limitation, a desktop computer, a laptop computer or the like personal computer (PC).

The terminal apparatus 400 may have stored thereon and be installed with at least one program prepared for providing an IoT-based smart home service, for example, a smart home application. The smart home application may run on the terminal apparatus 400 so that a user can easily manage and control various home appliances, in other words, a plurality of electronic apparatuses 101, 102, 103 and 104, and may provide various services using the plurality of electronic apparatuses 101, 102, 103 and 104 through interaction with the user.

According to an embodiment, a user executes the smart home application in the terminal apparatus 400, and designates the representative apparatus, in other words, the master apparatus, among the plurality of electronic apparatuses 101, 102, 103 and 104 through a graphic user interface (GUI) displayed on a display.

The display of the terminal apparatus 400 may, as illustrated in FIG. 4, display the GUI for designating the master apparatuses according to areas at home, for example, a living room, a kitchen, a bed room, etc. FIG. 4 illustrates an example of the GUI through which the master apparatus is designated for a first area among the plurality of areas, e.g. the living room. In the same manner, a user can use the GUI to designate the master apparatus with respect to at least one different area.

For example, the display of the terminal apparatus 400 may display a message 401 for guiding the master apparatus to be selected with respect to the first area, in other words, the living room, and a plurality of menu items 402, 403 and 404 corresponding to selectable electronic apparatuses.

A user may select one, e.g., 403 among the plurality of menu items 402, 403 and 404, and designate the electronic apparatus corresponding to the selected item 403, for example, the first electronic apparatus 101, e.g., the TV as the master apparatus. The electronic apparatuses 102, 103 and 104 other than the first electronic apparatus 101 in the first area are designated as the slave apparatuses.

The display of the terminal apparatus 400 may display a message 405 informing that the TV is selected as the master apparatus.

The terminal apparatus 400 may transmit a control signal related to activation or inactivation of microphones based on master/slave settings to the electronic apparatuses corresponding to the menu items 402, 403 and 404.

For example, a control signal for activating the microphone may be transmitted to the TV corresponding to the master apparatus, and a control signal for inactivating the microphone may be transmitted to the air conditioner and the air cleaner corresponding to the slave apparatuses.

Therefore, in the plurality of electronic apparatuses that receives the control signals, the microphone of the master apparatus is activated but the microphones of the slave apparatuses are inactivated, thereby completing the master/slave settings.

When the master/slave settings are completed, the display of the terminal apparatus 400 may display a message 406 that guides voice commands to be issuable in the master apparatus, e.g., the TV.

According to an embodiment, the foregoing master/slave settings for the plurality of electronic apparatuses 101, 102, 103 and 104 may be achieved through any one among the plurality of electronic apparatuses 101, 102, 103 and 104.

For example, a user may use the first electronic apparatus 101, in other words, the TV to designate the first electronic apparatus 101 or one among other electronic apparatuses 102, 103 and 104 as the representative apparatus, in other words, the master apparatus.

In this case, the first electronic apparatus 101 may have stored thereon and be installed with the smart home application. As the smart home application is executed, the first electronic apparatus 101 may display the GUI for the master/slave settings as shown in FIG. 4 on the display (refer, for example, to '110' in FIG. 5). The GUI may include the plurality of menu items corresponding to the plurality of electronic apparatuses 101, 102, 103 and 104.

A user may select one among the plurality of menu items through the remote controller or the like user input interface (refer, for example, to '130' in FIG. 5) and thus designate the apparatus corresponding to the selected menu item, for example, the first electronic apparatus 101 as the master apparatus for the first area. The other electronic apparatuses 102, 203 and 204 other than the first electronic apparatus 101 in the first area may be designated as the slave apparatuses.

Figure 5:
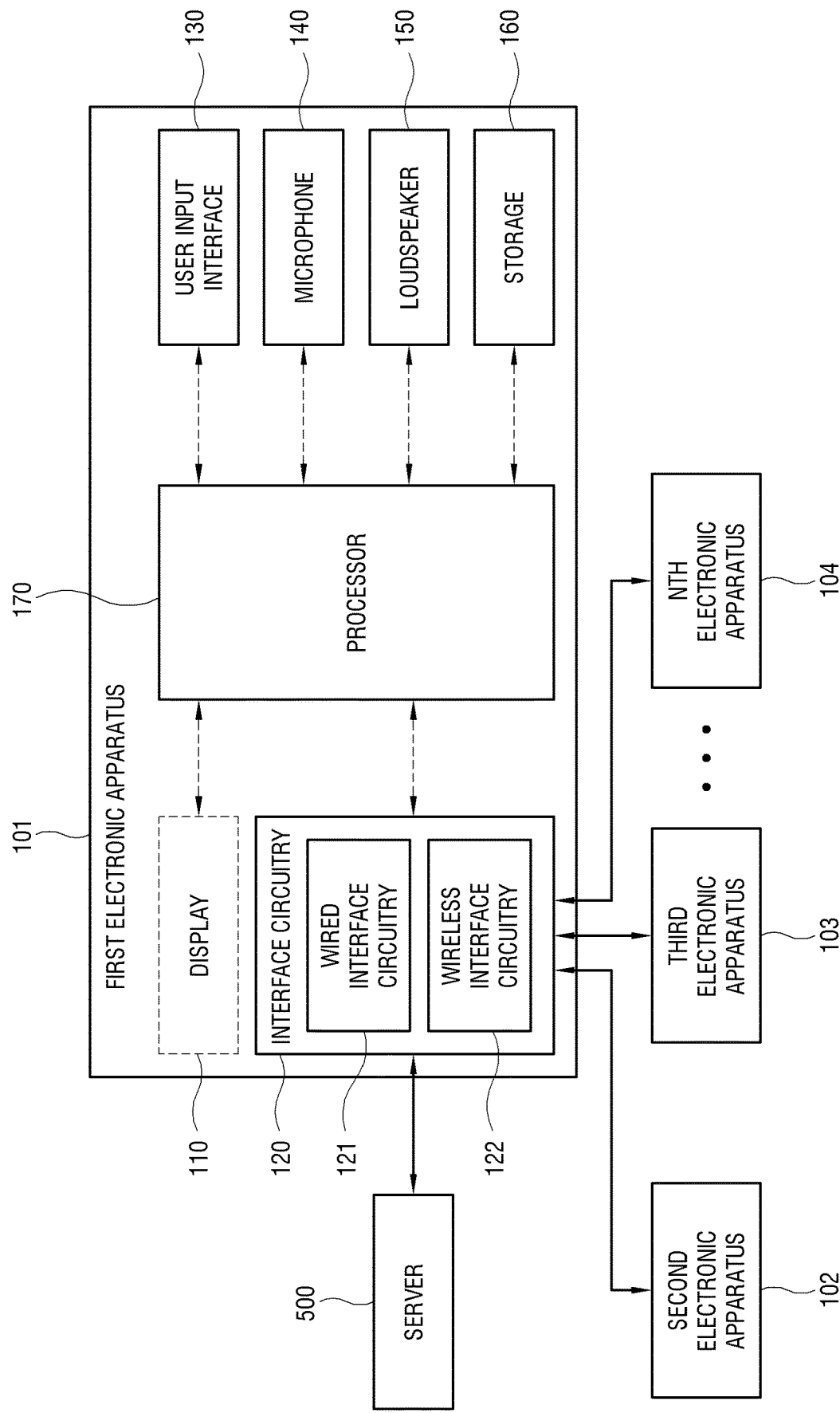
FIG. 5 is a block diagram illustrating an example configuration of a first electronic apparatus according to various embodiments.

Further, the first electronic apparatus 101 designated as the master apparatus may activate its own microphone 140 (refer to FIG. 5), and transmit a control signal for inactivating the microphones of the other electronic apparatuses 102, 103 and 104 to the other electronic apparatuses 102, 103 and 104 through an interface circuitry (refer, for example, to '120' in FIG. 5).

Therefore, the microphone of the master apparatus is activated, but the microphones of the slave apparatuses are inactivated in the plurality of electronic apparatuses 101, 102, 103 and 104, thereby completing the master/slave settings.

According to an embodiment, the GUI of one among the plurality of electronic apparatuses 101, 102, 103 and 104 or the external apparatus, e.g., the terminal apparatus 400 is convenient for a user to set the master/slave.

It will be described in greater detail below that the first electronic apparatus 101 among the plurality of electronic apparatuses 101, 102, 103 and 104 is designated as the representative apparatus (e.g., the master apparatus), receives a user's voice command and transmits the voice command to the server 500, and receives a control instruction from the server 500, thereby carrying out an operation based on the control instruction in a target corresponding to one among the plurality of electronic apparatuses 101, 102, 103 and 104 (e.g. at least one of the master apparatus or the slave apparatus). However, the disclosure is not limited to the example embodiment, and therefore it will be appreciated that another electronic apparatus, for example, the second electronic apparatus 102 or the third electronic apparatus 103 may be designated as the representative apparatus, and the operations of the representative apparatus in this case correspond to those of the first electronic apparatus 101.

FIG. 5 is a block diagram illustrating an example configuration of a first electronic apparatus according to various embodiments.

FIG. 5 illustrates example elements of the first electronic apparatus 101 operating as the master apparatus, but it will be understood that another electronic apparatus may include the same elements as shown in FIG. 5 when it operates as the master apparatus.

According to an embodiment, the first electronic apparatus 101 may include a display apparatus with the display 110 capable of displaying an image. However, the first electronic apparatus 101 is not limited to this embodiment. According to an embodiment, the first electronic apparatus 101 may include an image processing apparatus such as a set-top box capable of transmitting a signal to a separate connected display.

According to an embodiment, the first electronic apparatus 101 provided as the display apparatus may be embodied, for example, and without limitation, by a TV capable of processing a broadcast image based on at least one of a broadcast signal, broadcast information or broadcast data received from a transmitter of a broadcasting station. In this case, the first electronic apparatus 101 may include a tuner (not shown) to be tuned to a channel corresponding to a broadcast signal.

When the first electronic apparatus 101 is a TV, the first electronic apparatus 101 may receive broadcast content based on at least one among a broadcast signal, broadcast information or broadcast data from a transmitter of a broadcasting station directly or through an additional apparatus connectable with the first electronic apparatus 101 by a cable, for example, through a set-top box (STB), a one-connect box (OC box), a media box, etc. The connection between the first electronic apparatus 101 and the additional apparatus is not limited to the cable, but may employ various wired/wireless interfaces.

The first electronic apparatus 101 may, for example, wirelessly receive broadcast content as a radio frequency (RF) signal transmitted from the broadcasting station. To this end, the first electronic apparatus 101 may include an antenna for receiving a signal.

In the first electronic apparatus 101, the broadcast content may be received through a terrestrial wave, a cable, a satellite, etc., and a signal source is not limited to the broadcasting station. For example, any apparatus or station capable of transmitting and receiving data may be included in the image source according to the disclosure.

Standards of a signal received in the first electronic apparatus 101 may be varied depending on the types of the apparatus, and the first electronic apparatus 101 may receive a signal as image content based on high definition multimedia interface (HDMI), HDMI-consumer electronics control (CEC), display port (DP), digital visual interface (DVI), composite video, component video, super video, DVI, Thunderbolt, RGB cable, syndicat des constructeurs d'appareils radiorécepteurs et téléviseurs (SCART), universal serial bus (USB), or the like standards by a cable, according to the interface circuitry 120.

According to an embodiment, the first electronic apparatus 101 may be embodied, for example, and without limitation, by a smart TV or an Internet protocol (IP) TV. The smart TV may refer, for example, to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV may include an open software platform to provide an interactive service to a user. Therefore, the smart TV is capable of providing various pieces of content, for example, content of an application for a predetermined service to a user through the open software platform. Such an application may refer, for example, to an application program for providing various kinds of services, for example, a social network service (SNS), finance, news, weather, a map, music, a movie, a game, an electronic book, etc.

However, the disclosure is not limited to the embodiment of the first electronic apparatus 101, but the first electronic apparatus 101 may be applied to various embodiments for processing an image besides the TV, for example, applied to a monitor of a desktop computer, a laptop computer or the like Pc.

The first electronic apparatus 101 may process a signal to display a moving image, a still image, an application, an on-screen display (OSD), a user interface (UI) for controlling various operations, etc. on a screen based on a signal/data stored in an internal/external storage medium.

The first electronic apparatus 101 may use wired or wireless network communication to receive content from various external apparatuses including a content provider provided to provide content, but there are no limits to the kinds of communication.

For example, the first electronic apparatus 101 may use the wireless network communication to receive a signal corresponding to standards of Wi-Fi, Wi-Fi Direct, Bluetooth, Bluetooth low energy, Zigbee, UWB, NFC, etc. as image content corresponding to the type of the interface circuitry 120. Further, the first electronic apparatus 101 may use Ethernet or the like wired network communication to receive a content signal.

According to an embodiment, the first electronic apparatus 101 may, as illustrated in FIG. 5, include the display 110, the interface circuitry 120, the user input interface (e.g., including user interface circuitry) 130, the microphone 140, a loudspeaker 150, the storage 160 and the processor (e.g., including processing circuitry) 170. The interface circuitry 120 may include, for example, wired interface circuitry 111 and wireless interface circuitry 112.

It will be understood that FIG. 5 merely illustrates example elements of the first electronic apparatus 101 according to an embodiment, and the first electronic apparatus according to an embodiment may include elements different from those of FIG. 5. In other words, the first electronic apparatus 101 may include another element besides the elements shown in FIG. 5, or may exclude at least one element from the elements shown in FIG. 5. Further, the first electronic apparatus 101 may be embodied by changing some elements of those shown in FIG. 5.

The display 110 may display an image.

There are no limits to the types of the display 110, and the display 110 may be embodied by various display types such as, for example, and without limitation, liquid crystal, plasma, a light-emitting diode, an organic light-emitting diode, a surface-conduction electron-emitter, a carbon nanotube, nano-crystal, etc. According to an embodiment, the display 110 may include a display panel for displaying an image thereon, and further include additional elements, for example, a driver according to its types.

According to an embodiment, the display 110 may display the GUI for the master/slave settings of the plurality of electronic apparatuses 101, 102, 103 and 104. The plurality of electronic apparatuses 101, 102, 103 and 104 may be placed in predetermined areas at home, for example, the living room, the kitchen, the bed room, etc. The GUI may include a plurality of menu items corresponding to the plurality of electronic apparatuses 101, 102, 103 and 104, and selectable by a user. When a user makes a user input for selecting one among the plurality of menu items, the electronic apparatus corresponding to the selected menu item may be designated as a master, in other words, representative apparatus.

According to an embodiment, the display 110 may display a response message received from the server 500 in response to a voice command. The response message may, for example, include a GUI for informing a user of a result from processing the voice command. Thus, the process result of the voice command is provided as an image to a user through the first electronic apparatus 101 operating as the master, even though the electronic apparatuses 102, 103 and 104 operating as the slaves do not include the display 110.

The interface circuitry 120 may include circuitry configured to allow the first electronic apparatus 101 to communicate with various external apparatuses including other electronic apparatuses 102, 103 and 104, the server 500 or the terminal apparatus 400.

The interface circuitry 120 may include, for example, wired interface circuitry 121. The wired interface circuitry 121 may include a connector for transmitting/receiving a signal/data based on the standards such as, for example, and without limitation, HDMI, HDMI-CEC, USB, Component, DP, DVI, Thunderbolt, RGB cables, etc. Here, the wired interface circuitry 121 may include at least one connector, terminal or port respectively corresponding to such standards.

The wired interface circuitry 121 may be embodied to include an input port to receive a signal from an image source or the like, and further include an output port as necessary to interactively transmit and receive a signal.

The wired interface circuitry 121 may include a connector, a port, etc. based on video and/or audio transfer standards such as, for example, and without limitation, HDMI, DisplayPort, DVI, Thunderbolt, Composite video, Component video, super video, SCART, etc. to connect with an antenna for receiving a broadcasting signal based on terrestrial/satellite or the like broadcasting standards, or connect with a cable for receiving a broadcast signal based on a cable broadcasting standards. The first electronic apparatus 101 may include a built-in antenna for receiving a broadcast signal.

According to an embodiment, when a video/audio signal received through the interface 120 is a broadcast signal, the first electronic apparatus 101 may further include a tuner to be tuned to the channels corresponding to the received broadcast signals. The tuner may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

The wired interface circuitry 121 may include a connector, a port, etc. based on universal data transfer standards such as a USB port, etc. The wired interface circuitry 121 may include a connector, a port, etc. to which an optical cable based on optical transfer standards is connectable. The wired interface circuitry 121 may include a connector, a port, etc. which connects with an external microphone or an external audio apparatus having a microphone, and receives an audio signal from the audio apparatus. The interface circuitry 121 may include a connector, a port, etc. which connects with a headset, an earphone, an external loudspeaker or the like audio apparatus, and transmits or outputs an audio signal to the audio apparatus. The wired interface circuitry 121 may include a connector or a port based on Ethernet and the like network transfer standards. For example, the wired interface circuitry 121 may be embodied by a local area network (LAN) card or the like connected to a router or a gateway by a cable.

The wired interface circuitry 121 may connect with a set-top box, an optical media player or the like external apparatus, an external display apparatus, a loudspeaker, a server by 1:1 or 1:N (where, N is a natural number) by a cable through the connector or the port, thereby receiving a video/audio signal from the corresponding external apparatus or transmitting a video/audio signal to the corresponding external apparatus. The wired interface circuitry 121 may include connectors or ports to respectively transmit video/audio signals.

The wired interface circuitry 121 may be embodied by a communication circuitry including wireless communication modules (e.g. an S/W module, a chip, etc.) corresponding to various kinds of communication protocols.

According to an embodiment, the wired interface circuitry 121 may be internally provided in the first electronic apparatus 101, or may be provided in the form of a dongle or a module to be detachably connected to the connector of the first electronic apparatus 101.

The interface circuitry 120 may include wireless interface circuitry 122. The wireless interface circuitry 122 may be variously embodied corresponding to the embodiments of the first electronic apparatus 101. For example, the wireless interface circuitry 122 may use wireless communication based on RF, Zigbee, Bluetooth (BT), Bluetooth Low Energy (BLE), Wi-Fi, Wi-Fi direct, UWB, NFC or the like.

The wireless interface circuitry 122 may be embodied by communication circuitry including wired or wireless communication modules (e.g. an S/W module, a chip, etc.) corresponding to various kinds of communication protocols.

According to an embodiment, the wireless interface circuitry 122 may include a wireless local area network (WLAN) unit. The WLAN unit may be wirelessly connected to external apparatuses through an access point (AP) under control of the processor 170. The WLAN unit includes a Wi-Fi communication module.

According to an embodiment, the wireless interface circuitry 122 may include a wireless communication module supporting one-to-one direct communication between the first electronic apparatus 101 and the external apparatus wirelessly without the AP. The wireless communication module may be embodied to support Wi-Fi direct, BT, BLE, or the like communication method. When the first electronic apparatus 101 performs direct communication with the external apparatus, the storage 160 may be configured to store identification information (e.g. media access control (MAC) address or Internet protocol (IP) address) about the external apparatus with which the communication will be performed.

In the first electronic apparatus 101 according to an embodiment, the wireless interface circuitry 122 may be configured to perform wireless communication with the external apparatus by at least one of the WLAN unit and the wireless communication module according to its performance.

According to an embodiment, the wireless interface circuitry 122 may further include a communication module based on various communication methods such as, for example, and without limitation, long-term evolution (LTE) or the like mobile communication, electromagnetic (EM) communication including a magnetic field, visible light communication (VLC), etc.

The wireless interface circuitry 122 may include an IR transmitter and/or an IR receiver to transmit and/or receive an infrared (IR) signal according to IR communication standards. For example, the wireless interface circuitry 122 may receive or input a remote-control signal from a remote controller or other external apparatuses or transmit or output a remote-control signal to other external apparatuses through the IR transmitter and/or IR receiver. The first electronic apparatus 101 may exchange a remote-control signal with the remote controller or other external apparatuses through the wireless interface circuitry 122 based on another method such as Wi-Fi, BT, etc.

According to an embodiment, the wireless interface circuitry 122 may transmit predetermined data as information about a voice command received through the microphone 140 to the server 500 or the like external apparatus. There are no limits to the format/kind of data to be transmitted, and the data may, for example, include an audio signal corresponding to a voice uttered by a user, voice features extracted from the audio signal, etc.

Further, the wireless interface circuitry 122 may receive a response signal corresponding to a process result of a corresponding voice command from the server 500 or the like external apparatus. The first electronic apparatus 101 may display an image corresponding to the voice process result on the display 110, or output a sound corresponding to the voice process result through an internal or external loudspeaker, based on the received signal.

In the first electronic apparatus 101 according to an embodiment, the wireless interface circuitry 122 may transmit information of a received voice command targeted for one among the first electronic apparatus 101, e.g., the master apparatus and other electronic apparatuses 102, 103 and 104, e.g., the slave apparatuses to the server 500, and receive a response signal corresponding to a process result of the voice command from the server 500.

Apparatus information, for example, identification information of at least one of a target apparatus or a representative apparatus may be transmitted together with the information of the voice command to the server 500, and thus both the response signal and the identification information of the target apparatus may be received from the server 500. The response signal may include at least one of a response message that informs a user of a result from processing the voice command or a control instruction for the target apparatus.

It will be understood that the foregoing embodiment is merely an example, and the information of the voice command may be processed by the first electronic apparatus 101 without being transmitted to the server 500. In other words, according to an embodiment, the first electronic apparatus 101 may be embodied to serve as a speech-to-text (STT) server.

Example processes related to the foregoing voice recognition will be described in greater detail below with reference to FIG. 9.

The first electronic apparatus 101 may communicate with the remote controller or the like input device through the wireless interface circuitry 122, and receive a sound signal corresponding to a user's voice from the input device.

In the first electronic apparatus 101 according to an embodiment, a communication module for communicating with the external server 500 or the like and a communication module for communicating with the remote controller may be different from each other. For example, the first electronic apparatus 101 may use an Ethernet modem or a Wi-Fi module to communicate with the server 500, and use a Bluetooth module to communicate with the remote controller.

In the first electronic apparatus 101 according to an embodiment, a communication module for communicating with the external server 500 or the like and a communication module for communicating with the remote controller may be the same with each other. For example, the first electronic apparatus 101 may use the Bluetooth module to communicate with the server 500 and the remote controller.

The user input interface 130 may include various user input circuitry and transmits various preset control instructions or unrestricted information to the processor 170 in response to a user input.

The user input interface 130 may include, for example, and without limitation, a keypad (or an input panel) including a power key, a numeral key, a menu key or the like buttons provided in the main body of the first electronic apparatus 101.

According to an embodiment, the user input interface 130 may include an input device including circuitry that generates a command/data/information/signal previously set to remotely control the first electronic apparatus 101 and transmits it to the first electronic apparatus 101. The input device may include, for example, and without limitation, a remote controller, a keyboard, a mouse, etc. and receive a user input as separated from the main body of the first electronic apparatus 101. The remote controller may include a touch sensor for receiving a user's touch input and/or a motion sensor for detecting its own motion caused by a user. The input device includes a terminal such as a smartphone in which a remote-control application is installed. In this case, the input device can receive a user's touch input through the touch screen.

The input device may be used as an external apparatus that performs wireless communication with the first electronic apparatus 101, in which the wireless communication is based on Bluetooth, IrDA, RF communication, WLAN, or Wi-Fi direct.

The microphone 140 may receive a sound, in other words, a sound wave.

According to an embodiment, the microphone 140 may receive a sound wave corresponding to a voice uttered by a user.

According to an embodiment, the microphone 140 may support far-field voice recognition, and be embodied in the form of a plurality of microphone arrays.

A sound input to the microphone 140 may be converted into an electric signal by a signal converter (not shown). According to an embodiment, the signal converter may include an analog-to-digital (AD) converter to convert an analog sound wave into a digital signal.

According to an embodiment, the microphone 140 is provided in the first electronic apparatus 101, and there are no limits to the number, shape and position of microphones provided in the first electronic apparatus 101.

According to an embodiment, the first electronic apparatus 101 may include the microphone 140 provided in a separate apparatus. For example, when the first electronic apparatus 101 is a display apparatus like a TV, a sound wave may be received through the microphone 140 provided in the remote controller capable of receiving a user input, and a sound signal corresponding to the sound wave may be transmitted from the remote controller to the first electronic apparatus 101. An analog sound wave received through the microphone 140 of the remote controller may be converted into a digital signal and transmitted to the first electronic apparatus 101.

A voice command uttered by a user may, for example, be targeted for the master apparatus, e.g., the first electronic apparatus 101, but may be targeted for one of the slave apparatuses, e.g., the electronic apparatuses 102, 103 and 104. In other words, a user can issue a voice command through the first electronic apparatus 101 operating as the master, even though the electronic apparatuses 102, 103 and 104 operating as the slaves do not include the microphone 140.

The loudspeaker 150 outputs a sound.

The loudspeaker 150 may, for example, be embodied by at least one loudspeaker capable of outputting a sound having an audible frequency range of 20 Hz to 20 KHz. The loudspeaker 150 may output a sound corresponding to audio signal/sound signals corresponding to the plurality of channels.

According to an embodiment, the loudspeaker 150 may output a sound generated based on a process of a sound signal corresponding to the voice command received in the microphone 140.

The sound signal corresponding to the sound output from the loudspeaker 150 may be included in the response message received from the server 500 as a result from processing the voice command received in the microphone 140. The output sound may, for example, correspond to a control instruction targeted for the master apparatus, e.g., the first electronic apparatus 101, but may correspond to a control instruction targeted for one of the slave apparatuses, e.g., the electronic apparatuses 102, 103 and 104. In other words, a result from processing the voice command may be provided as a sound to a user through the first electronic apparatus 101 operating as the master, even though the electronic apparatuses 102, 103 and 104 operating as the slaves may not include the loudspeaker 150.

The storage 160 may be configured to store various pieces of data of the first electronic apparatus 101.

The storage 160 may be embodied by a nonvolatile memory (or a writable read only memory (ROM)) which can retain data even though the first electronic apparatus 101 is powered off, and mirror changes. For example, the storage 160 may include one among a flash memory, an HDD, an erasable programmable ROM (EPROM) or an electrically erasable programmable ROM (EEPROM). The storage 160 may further include a volatile memory such as a dynamic random access memory (DRAM) or a static random access memory (SRAM), of which reading or writing speed for the first electronic apparatus 101 is faster than that of the nonvolatile memory.

Data stored in the storage 160 may for example include not only an OS for driving the first electronic apparatus 101 but also various programs, applications, image data, appended data, etc. executable on the OS.

For example, the storage 160 may be configured to store a signal or data input/output corresponding to operations of the elements under control of the processor 170. The storage 160 may be configured to store a control program for controlling the first electronic apparatus 101, an application provided by the manufacturer or downloaded from the outside, a relevant user interface (UI), images for providing the UI, user information, documents, databases, or the concerned data.

According to an embodiment, the storage 160 may be stored and installed a voice recognition application for performing a voice recognition function. The voice recognition application is activated, for example, switched over from a background mode to a foreground mode in response to a user's input/utterance of a previously defined starting word (hereinafter, referred to as a trigger word or a wake-up word (WUW)), thereby starting an operation for voice recognition.

According to an embodiment, the application stored in the storage 160 may include a machine learning application or a deep learning application which operates based on previously performed learning.

The storage 160 may be configured to further store learning data with which the processor 170 performs calculation based on a predetermined learning algorithm. Here, as an example of the learning data, a model that has learned a user's voice command based on the algorithm may be stored in the storage 160.

According to an embodiment, the first electronic apparatus 101 may be embodied to perform an AI operation in an on-device environment in which learning based on the data of the storage 160 embedded in the apparatus itself and calculation using the algorithm model based on the learning are performed. However, according to an embodiment, the first electronic apparatus 101 is not limited to the on-device AI apparatus. According to an embodiment, the first electronic apparatus 101 may be embodied to perform learning based on data stored in a database provided in a separate server connectable through the interface circuitry 110 and calculation using the algorithm model based on the learning.

According to an embodiment, the storage 160 of the first electronic apparatus 101 operating as the representative apparatus may be configured to store identification (ID) information of at least one slave apparatus grouped by a grouping, for example, the second electronic apparatus 102, the third electronic apparatus 103, . . . , the Nth electronic apparatus 104.

According to an embodiment, an image displayed in the first electronic apparatus 101 may be based on data stored in a flash memory, a hard disk, or the like nonvolatile storage 160. The storage 160 may be provided inside or outside the first electronic apparatus 101, and the storage 160 provided outside may be connected to the first electronic apparatus 101 via the wired interface circuitry 121.

According to an embodiment, the term 'storage' may include the storage 160, the ROM (not shown) in the processor 170, a RAM (not shown) or a memory card (not shown, e.g. a micro SD card, a memory stick, etc.) mountable to the first electronic apparatus 101.

The processor 170 may include various processing circuitry and performs control for operating general elements of the first electronic apparatus 101. The processor 170 may include a control program (or an instruction) to perform such a control operation, a nonvolatile memory in which the control program is installed, a volatile memory to which at least a part of the installed control program is loaded, and at least one of general-purpose processors such as a microprocessor, an application processor or a central processing unit (CPU) that executes the loaded control program.

The processor 170 may include a single-core processor, a dual-core processor, a triple-core processor, a quad-core processor, or the like multiple-core processor. The processor 170 may include a plurality of processors, for example, a main processor and a sub processor that operates in a sleep mode (e.g. when the display apparatus is supplied with only standby power and does not serve to display an image). Further, the processor, the ROM, and the RAM may be connected to one another through an internal bus.

According to an embodiment, the processor 170 may include an image processor that performs various preset processes with regard to content data received from various external apparatuses. The processor 170 outputs an output signal generated or combined by performing an image process to the display 110, so that an image corresponding to an image signal can be displayed on the display 110.

The image processor may include a decoder for decoding an image signal to have an image format of the first electronic apparatus 101, and a scaler for adjusting the image signal to correspond to the output standards of the display 110.

According to an embodiment, the decoder may for example be embodied by an H.264 decoder, but not limited thereto. In other words, the video decoder in this embodiment may for example be embodied by a moving picture experts group (MPEG) decoder, a high efficiency video codec (HEVC) decoder, or the like decoders corresponding to various compression standards.

Further, there are no limits to the kinds of content to be processed by the image processor according to the disclosure. For example, the content to be processible in the image processor may include not only a moving picture like a video, but also a picture of joint photographic experts group (JPEG) file, a background image, and the like still image, a graphic user interface (GUI), etc.

There are no limits to the kinds of video processing process performed in the image processor. For example, the image processor may for example perform at least one of various processes such as de-interlacing for converting an interlaced broadcast signal into a progressive broadcast signal, noise reduction for improving image quality, detail enhancement, frame refresh rate conversion, line scanning, etc.

According to an embodiment, the image processor may be embodied by a video board including circuit elements such as various chipsets for performing respective processes, a memory, electronic parts, wirings, etc. which are mounted on to a printed circuit board (PCB). In this case, the processor 170 including a tuner and an image processor of the first electronic apparatus 101 may be provided on a single video board. Of course, this is merely an example, and they may be arranged on a plurality of PCBs connecting and communicating with each other.

According to an embodiment, the processor 170 may include a signal processor that processes an audio, in other words, sound signal. The sound signal processed in the signal processor may be output through the loudspeaker 150.

There are no limits to the embodiments of the image processor and the signal processor. According to an embodiment, the image processor or the signal processor may be embodied by microprocessors separated from the processor 170.

According to an embodiment, the processor 170 may be embodied as included in the main SoC mounted to the PCB internally provided in the first electronic apparatus 101.

The control program may include a program(s) achieved by at least one of a BIOS, a device driver, an OS, a firmware, a platform, or an application. According to an example embodiment, the application program may be previously installed or stored in the first electronic apparatus 101 when the first electronic apparatus 101 is manufactured, or may be installed in the first electronic apparatus 101 on the basis of application data received from the outside when it is required in the future. The application data may for example be downloaded from an external server such as an application market to the first electronic apparatus 101. Such an external server is merely an example of the computer program product according to the disclosure, but not limited thereto.

The control program may be recorded in a storage medium readable by a computer or the like machine. Such a machine-readable storage medium may be given in the form of a non-transitory storage medium. The 'non-transitory storage medium' is tangible excluding a signal (e.g. an electromagnetic wave), and this term does not distinguish between a case where data is semi-permanently stored in the storage medium and a case where data is transitorily stored in the storage medium. For example, the 'non-transitory storage medium' may include a buffer in which data is temporarily stored.

According to an embodiment, the foregoing operations of the processor 170 may be embodied by a computer program stored in the computer program product (not shown) provided separately from the first electronic apparatus 101.

In this case, the computer program product includes a memory in which an instruction corresponding to a computer program is stored, and a processor. When executed by the processor, the instruction includes transmitting information of a voice command and information of an apparatus corresponding to the voice command to the server through the interface circuitry 120, receiving a response message to the voice command from the server 500 through the interface circuitry 120, and outputting the received response message through the apparatus corresponding to the voice command. The apparatus corresponding to the voice command may include at least one of the target apparatus that performs the operation corresponding to the voice command or the representative apparatuses that receives the voice command, and the response message may correspond to a message output format of the apparatus corresponding to the voice command among a plurality of formats.

Therefore, the first electronic apparatus 101 may download and execute a computer program stored in a separate computer program product, and perform the operations of the processor 170.

Figure 6:
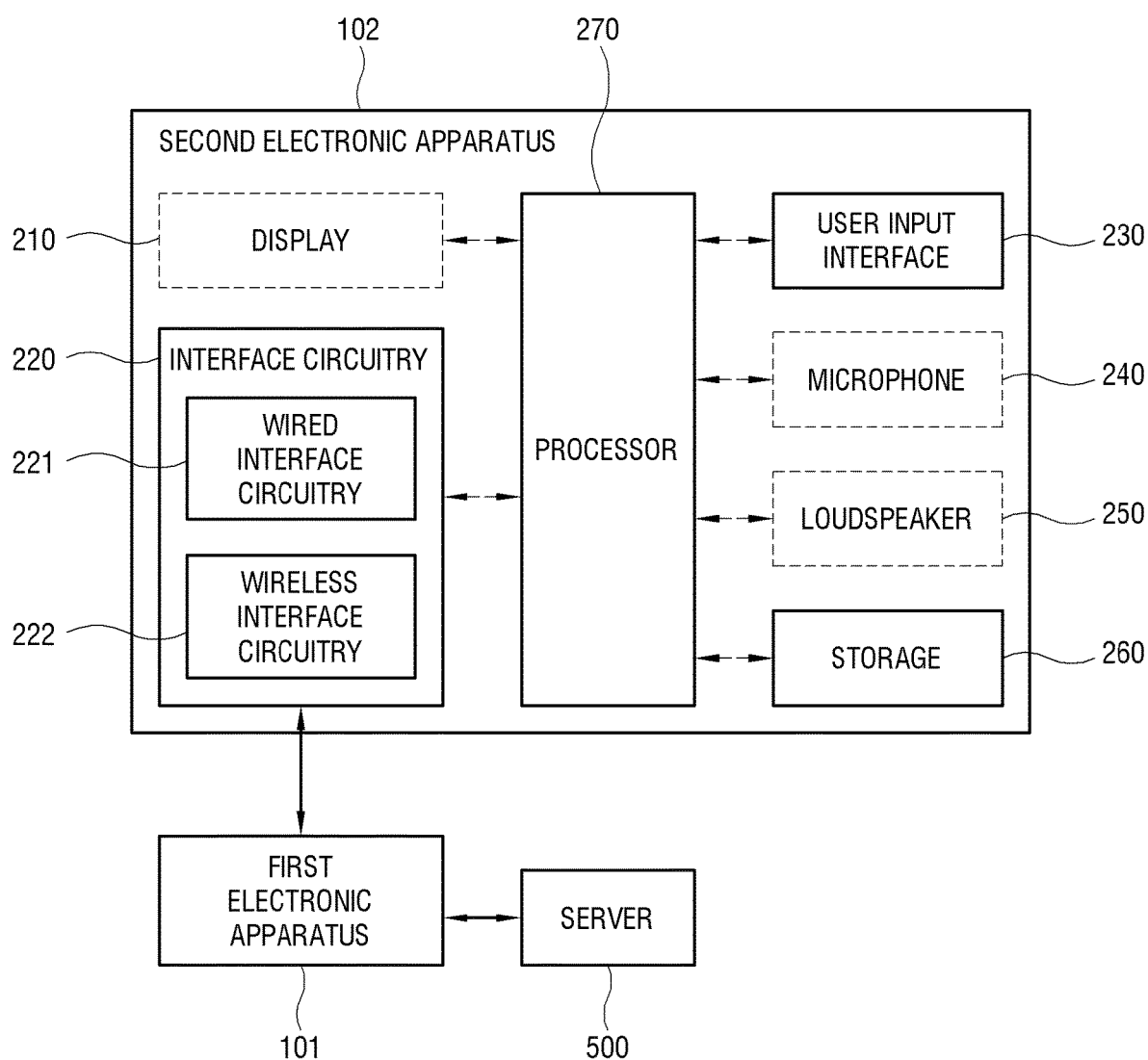
FIG. 6 is a block diagram illustrating an example second electronic apparatus according to various embodiments.

FIG. 6 is a block diagram illustrating an example configuration of a second electronic apparatus according to various embodiments.

FIG. 6 illustrates example elements of the second electronic apparatus 102 operating as the slave apparatus, but it will be understood that another electronic apparatus may include the same elements as shown in FIG. 6 when it operates as the slave apparatus. For example, the elements of the third electronic apparatus 103 shown in FIG. 5 may correspond to the elements of the second electronic apparatus 102 shown in FIG. 6.

According to an embodiment, the second electronic apparatus 102 may include, for example, an air conditioner. However, the second electronic apparatus 102 is not limited to this embodiment. According to an embodiment, the second electronic apparatus 102 may include an air cleaner, a refrigerator, a TV, or the like other home appliances.

According to an embodiment, the second electronic apparatus 102 may, as shown in FIG. 6, include a display 210, interface circuitry 220, a user input interface (e.g., including user interface circuitry) 230, a microphone 240, a loudspeaker 250, a storage 260 and a processor (e.g., including processing circuitry) 270. The interface circuitry 220 may include a wired interface circuitry 211 and a wireless interface circuitry 212.

However, FIG. 6 merely illustrates example elements of the second electronic apparatus 102 according to an embodiment, and the first electronic apparatus according to an embodiment may include elements different from those of FIG. 6. In other words, the second electronic apparatus 102 may include another element besides the elements shown in FIG. 6, or may exclude at least one element from the elements shown in FIG. 6. Further, the second electronic apparatus 102 may be embodied by changing some elements of those shown in FIG. 6.

According to the disclosure, elements, which perform the same operations as those of the first electronic apparatus 101 shown in FIG. 5, among the elements of the second electronic apparatus 102 shown in FIG. 6, will be equally named, and repetitive descriptions thereof may not be repeated here.

The display 210 may display an image. There are no limits to the types of the display 210.

According to an embodiment, the display 210 may include a touch screen for receiving a user's touch input.

According to an embodiment, the display 210 may display the GUI for the master/slave settings of the plurality of electronic apparatuses 101, 102, 103 and 104. The plurality of electronic apparatuses 101, 102, 103 and 104 may be placed in predetermined areas at home, for example, the living room, the kitchen, the bed room, etc.

The GUI may include a plurality of menu items corresponding to the plurality of electronic apparatuses 101, 102, 103 and 104, and selectable by a user. When a user makes a user input for selecting one among the plurality of menu items, the electronic apparatus corresponding to the selected menu item may be designated as a master, in other words, representative apparatus.

The interface circuitry 220 allows the second electronic apparatus 102 to communicate with various external apparatuses including the first electronic apparatus 101 or the terminal apparatus 400.

The interface circuitry 220 may include wired interface circuitry 221.

The wired interface circuitry 221 may include a connector, a port, etc. based on universal data transfer standards such as a USB port, etc.

The wired interface circuitry 221 may be embodied by a communication circuitry including wireless communication modules (e.g. an S/W module, a chip, etc.) corresponding to various kinds of communication protocols.

The interface circuitry 220 may include wireless interface circuitry 222. The wireless interface circuitry 222 may be variously embodied corresponding to the embodiments of the second electronic apparatus 102. For example, the wireless interface circuitry 222 may use wireless communication based on RF, Zigbee, BT, BLE, Wi-Fi, Wi-Fi direct, UWB, NFC or the like.

The wireless interface circuitry 222 may be embodied by a communication circuitry including wired or wireless communication modules (e.g. an S/W module, a chip, etc.) corresponding to various kinds of communication protocols.

According to an embodiment, the wireless interface circuitry 222 includes a WLAN unit. The WLAN unit may be wirelessly connected to external apparatuses through an AP under control of the processor 270. The WLAN unit includes a Wi-Fi communication module.

According to an embodiment, the wireless interface circuitry 222 includes a wireless communication module supporting one-to-one direct communication between the second electronic apparatus 102 and the external apparatus wirelessly without the AP. The wireless communication module may be embodied to support Wi-Fi direct, BT, BLE, or the like communication method. When the second electronic apparatus 102 performs direct communication with the external apparatus, the storage 260 may be configured to store identification information (e.g. MAC address or IP address) about the external apparatus with which the communication will be performed.

In the second electronic apparatus 102 according to an embodiment, the wireless interface circuitry 222 is configured to perform wireless communication with the external apparatus by at least one of the WLAN unit and the wireless communication module according to its performance.

The wireless interface circuitry 222 may include an IR transmitter and/or an IR receiver to transmit and/or receive an IR signal according to IR communication standards. For example, the wireless interface circuitry 222 may receive or input a remote-control signal from a remote controller or other external apparatuses or transmit or output a remote-control signal to other external apparatuses through the IR transmitter and/or IR receiver. The second electronic apparatus 102 may exchange a remote-control signal with the remote controller or other external apparatuses through the wireless interface circuitry 222 based on another method such as Wi-Fi, BT, etc.

In the second electronic apparatus 102 according to an embodiment, a communication module for communicating with the external server or the like and a communication module for communicating with the remote controller may be different from each other. For example, the second electronic apparatus 102 may use an Ethernet modem or a Wi-Fi module to communicate with the server, and use a Bluetooth module to communicate with the remote controller.

In the second electronic apparatus 102 according to an embodiment, a communication module for communicating with the external server or the like and a communication module for communicating with the remote controller may be the same with each other. For example, the second electronic apparatus 102 may use the Bluetooth module to communicate with the server and the remote controller.

According to an embodiment, the second electronic apparatus 102 may receive a control instruction targeted for the second electronic apparatus 102 from the first electronic apparatus 101 through the interface circuitry 220. The control instruction may include a control code for controlling operations of the target apparatus, for example, the second electronic apparatus 102, and be included in the response signal generated by the server 500 based on the voice command.

According to an embodiment, the second electronic apparatus 102 may further receive an audio signal corresponding to a sound output from the loudspeaker 250 or a GUI that informs a user of a result from processing the voice command, as a process result of the voice command from the first electronic apparatus 101.

The user input interface 230 may include various user input interface circuitry and transmits various preset control instructions or unrestricted information to the processor 270 in response to a user input.

The user input interface 230 may include a keypad (or an input panel) including a power key, a numeral key, a menu key or the like buttons provided in the main body of the second electronic apparatus 102.

According to an embodiment, the user input interface 230 may include a remote controller or the like input device that generates a command/data/information/signal previously set to remotely control the second electronic apparatus 102 and transmits it to the second electronic apparatus 102. The input device includes a terminal such as a smartphone in which a remote-control application is installed. In this case, the input device can receive a user's touch input through the touch screen.

The input device may be used as an external apparatus that performs wireless communication with the second electronic apparatus 102, in which the wireless communication is based on Bluetooth, IrDA, RF communication, WLAN, or Wi-Fi direct.

The microphone 240 may receive a sound, in other words, a sound wave. According to an embodiment, the microphone 240 may receive a sound wave corresponding to a voice uttered by a user. However, FIG. 6 illustrates an example in which the second electronic apparatus 102 operates as the slave apparatus, in which the microphone 240 of the second electronic apparatus 102 may become inactivated.

The loudspeaker 250 outputs a sound. The loudspeaker 250 may, for example, be embodied by at least one loudspeaker capable of outputting a sound having an audible frequency range of 20 Hz to 20 KHz. The loudspeaker 250 may output a sound corresponding to audio signal/sound signals corresponding to the plurality of channels.

According to an embodiment, the loudspeaker 250 may output a sound generated based on a process of a sound signal corresponding to the voice command. Here, the sound signal corresponding to the sound output from the loudspeaker 250 may be included in the response signal/data transmitted from the first electronic apparatus 101.

The storage 260 may be configured to store various pieces of data of the second electronic apparatus 102.

Data stored in the storage 260 may for example include not only an OS for driving the second electronic apparatus 102 but also various programs, applications, image data, appended data, etc. executable on the OS.

The processor 270 may include various processing circuitry and performs control for operating general elements of the second electronic apparatus 102. The processor 270 may include a control program (or an instruction) to perform such a control operation, a nonvolatile memory in which the control program is installed, a volatile memory to which at least a part of the installed control program is loaded, and at least one of general-purpose processors such as a microprocessor, an application processor or a CPU that executes the loaded control program.

Below, it will be described with reference to the accompanying drawings that a voice recognition system including a plurality of electronic apparatuses receives a voice command and performs operations based on the voice command according to the disclosure.

Figure 7:
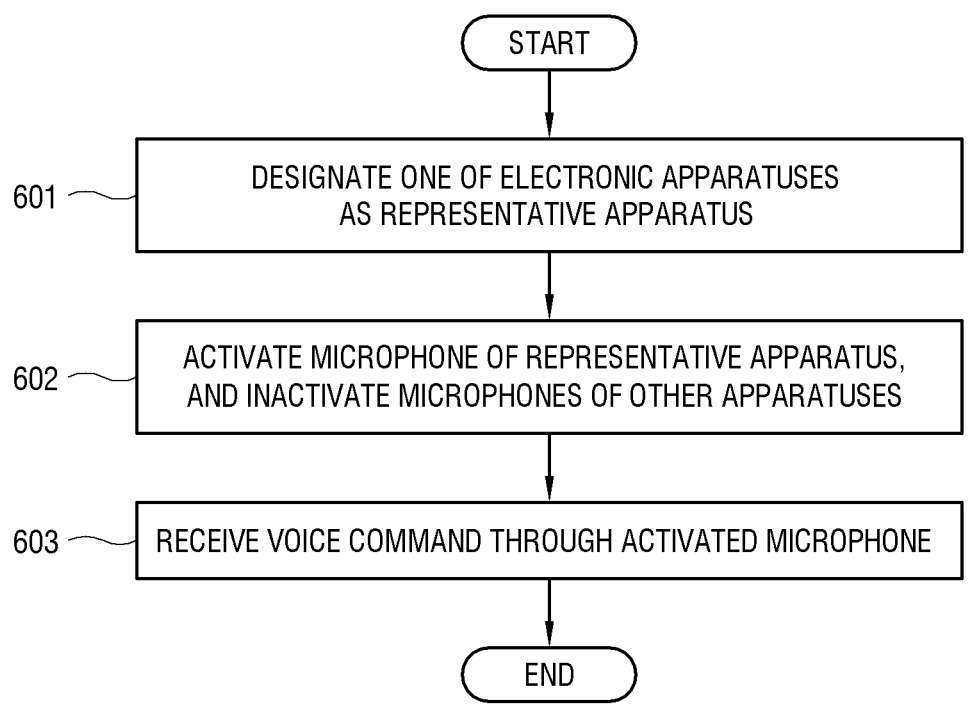
FIG. 7 is a flowchart illustrating an example method of designating a representative apparatus according to various embodiments.

FIG. 7 is a flowchart illustrating an example method of designating a representative apparatus according to various embodiments.

According to an embodiment, one among the plurality of electronic apparatuses 101, 102, 103 and 104 placed in a predetermined area at home, for example, the first area, e.g., the living room may be designated as the representative apparatus (601), in other words, the master apparatus. Such designation of the representative apparatus may be carried out by the external apparatus, for example, a smartphone or the like terminal apparatus 400 or by one of the plurality of electronic apparatuses 101, 102, 103 and 104, for example, the first electronic apparatus 101. Below, it will be described by way of example that such designation is performed by the first electronic apparatus 101.

As shown in FIG. 7, the processor 170 of the first electronic apparatus 101 may receive a user's selection for designating one among the plurality of electronic apparatuses 101, 102, 103 and 104 as the representative apparatus (601).

At operation 601, the processor 170 may control the display 110 to display the plurality of menu items corresponding to the plurality of electronic apparatuses 101, 102, 103 and 104 and selectable by a user as shown in FIG. 4, and identify whether a user's choice for selecting one among the plurality of menu items is received in the user input interface 130.

The electronic apparatus corresponding to the selected menu item, for example, the first electronic apparatus 101 is designated as the representative apparatus, in other words, the master apparatus, and the other electronic apparatuses 102, 103 and 104 are designated as the slave apparatuses.

At operation 601, the processor 170 may control the storage 160 to store information about the slave apparatuses, for example, the second electronic apparatus 102, the third electronic apparatus 103, . . . , the Nth electronic apparatus 104.

The processor 170 may control the microphone 104 to be activated in the representative apparatus, in other words, the first electronic apparatus 101 designated as the master apparatus in the operation 601, and control the microphones to be inactivated in the other apparatuses, in other words, the electronic apparatuses 102, 103 and 104 designated as the slave apparatus (602). The processor 170 may control the interface circuitry 120 to transmit a control signal including a command to inactivate the microphones to the electronic apparatuses 102, 103 and 104.

In operation 602, only the microphone 140 of the first electronic apparatus 101, e.g., the master apparatus among the plurality of electronic apparatuses 101, 102, 103 and 104 is activated, and the microphones of the other electronic apparatuses 102, 103 and 104 are inactivated.

Therefore, when a user utters a voice including the wake-up word (WUW) in one area, it is possible to prevent and/or avoid the microphones in the plurality of apparatuses from responding simultaneously or prevent and/or reduce increased misrecognition of the wake-up word or the like confusion from being intensified.

Further, the processor 170 may receive a voice command uttered by a user through the microphone 140 activated in the operation 602 (603).

Figure 8:
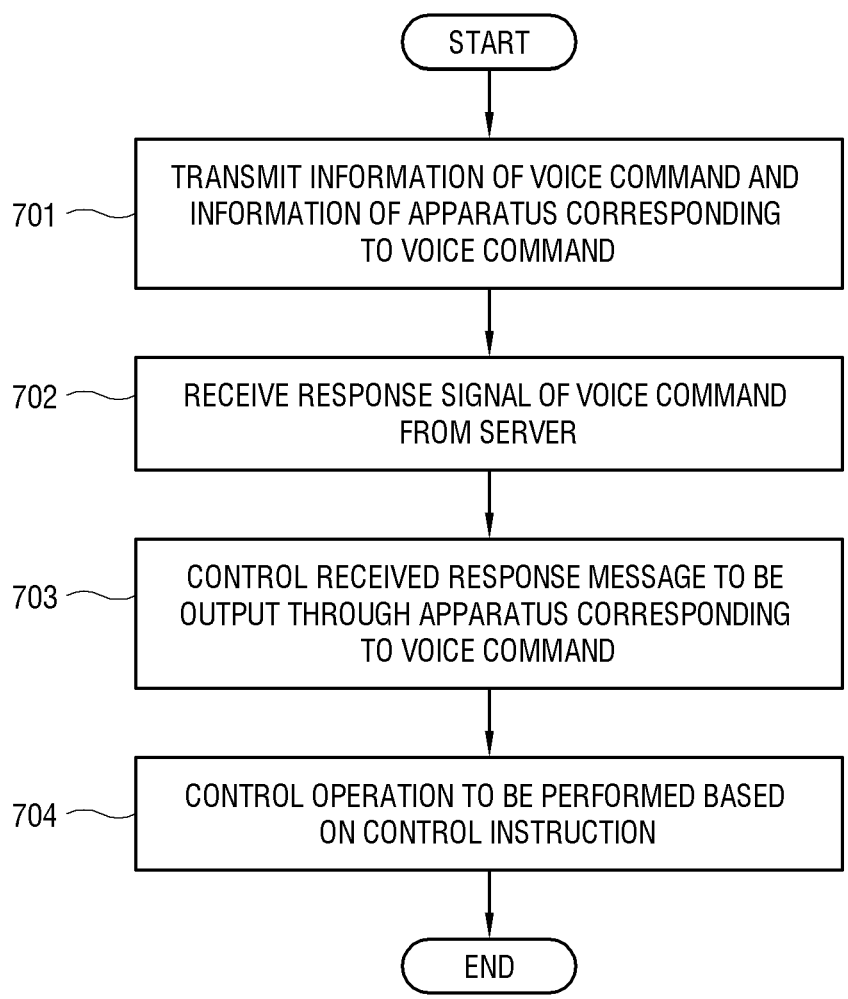
FIG. 8 is a flowchart illustrating an example method of receiving a voice command and outputting a response message corresponding to the voice command according to various embodiments.

FIG. 8 is a flowchart illustrating an example method of receiving a voice command and outputting a response message corresponding to the voice command according to various embodiments.

According to an embodiment, the representative apparatus, in other words, the electronic apparatus designated as the master apparatus among the plurality of electronic apparatuses 101, 102, 103 and 104 may receive a user's voice command. Below, it will be described by way of example that the first electronic apparatus 101 receives the voice command.

As illustrated in FIG. 8, the processor 170 of the first electronic apparatus 101 may transmit information about a voice command uttered by a user and information about the apparatus corresponding to the voice command to the server 500 (701).

The first electronic apparatus 101 designated as the master apparatus may receive the voice command targeted for itself and the voice command targeted for one among the other grouped apparatuses, e.g., the slave apparatuses through the microphone 140.

Based on a voice command uttered by a user received in the microphone 140, the processor 170 may transmit the information of the voice command and information of the apparatus corresponding to the voice command, in other words, at least one piece of information about the target apparatus that performs an operation corresponding to the voice command or the representative apparatus that receives the voice command, to the server 500 through the interface circuitry 120.

For example, the processor 170 may transmit at least one of the information about the target apparatus that performs the operation corresponding to the voice command (e.g., the information of the slave apparatus) or the information about the representative apparatus that receives the voice command (e.g., the information of the master apparatus) to the server 500 through the interface circuitry 120.

According to an embodiment, the processor 170 may transmit a list of grouped apparatuses including the master and slave apparatuses as the information about the apparatuses corresponding to the voice command, along with the information of the received voice command, to the server 500. The list of grouped apparatuses may include identification information about the master apparatus, e.g., the first electronic apparatus 101 and the slave apparatuses connected to the master apparatus, e.g., the second electronic apparatus 102, the third electronic apparatus 103, . . . , the Nth electronic apparatus 104. In this case, the server 500 may identify the target apparatus in the apparatus list, based on a recognition result of a user's intention to the voice command.

According to an embodiment, the processor 170 may transmit the identification information about the master apparatus as the information about the apparatus that receives the voice command, to the server 500 through the interface circuitry 120. Further, the processor 170 may further transmit the identification information about the target apparatus as the information about the apparatus that performs the operation corresponding to the voice command to the server 500 through the interface circuitry 120. Here, the target apparatus may be one of the master apparatus or the slave apparatuses.

Figure 9:
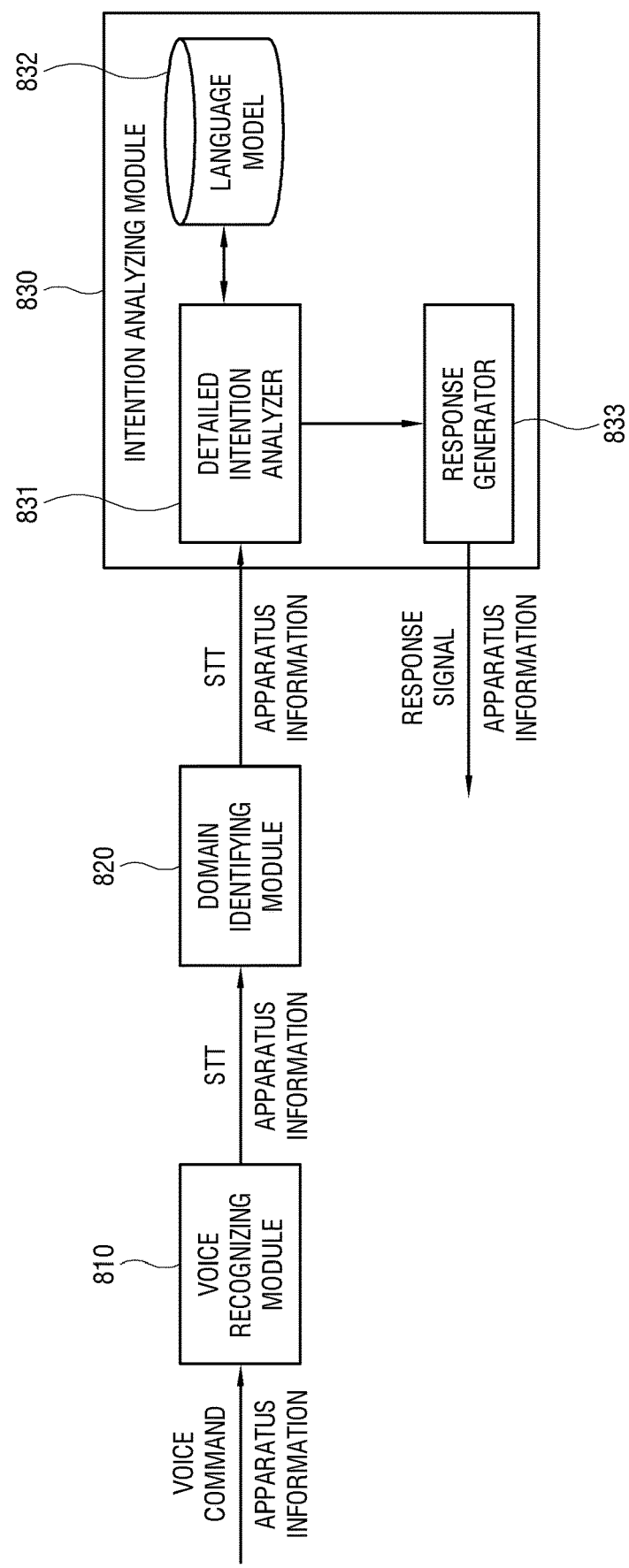
FIG. 9 is a diagram illustrating an example process of transmitting information about a voice command to a server and obtaining a response message based on the information according to various embodiments.
Figure 10:
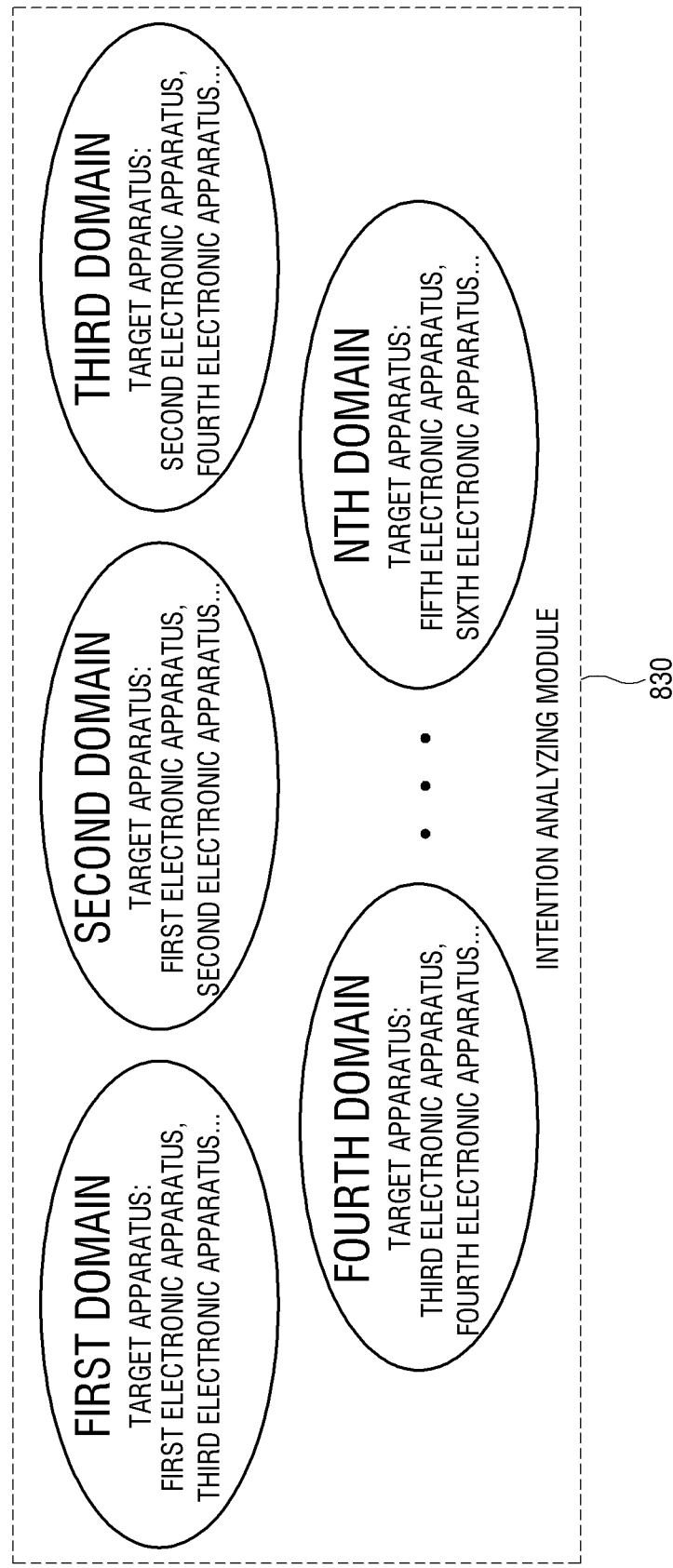
FIG. 10 is a diagram illustrating an example process of analyzing detailed intention of the voice command in the embodiment of FIG. 9 according to various embodiments.

FIG. 9 is a diagram illustrating an example process of transmitting information about a voice command to a server and obtaining a response message based on the information according to various embodiments, and FIG. 10 is a diagram illustrating an example process of analyzing detailed intention of the voice command in the embodiment of FIG. 9 according to various embodiments.

According to an embodiment, the server 500 provided to process information about a voice command received from the master apparatus may include a voice recognizing module (e.g., including processing circuitry and/or executable program elements) 810, a domain identifying module (e.g., including processing circuitry and/or executable program elements) 820, and an intention analyzing module (e.g., including processing circuitry and/or executable program elements) 830.

According to an embodiment, a plurality of servers 500 may be prepared, and the voice recognizing module 810, the domain identifying module 820, and the intention analyzing module 830 may be distributed to the plurality of servers.

According to an embodiment, at least one among the voice recognizing module 810, the domain identifying module 820, and the intention analyzing module 830, for example, the voice recognizing module 810 may be provided in the master apparatus, e.g., the first electronic apparatus 101, and thus the first electronic apparatus 101 may serve as an STT server.

As shown in FIG. 9, the information of the voice command output from the first electronic apparatus 101 and the information of the apparatus corresponding to the voice command may be transmitted to the voice recognizing module 810.

According to an embodiment, the voice recognizing module 810 may include various processing circuitry and/or executable program elements, including an automatic speech recognition (ASR) engine, and perform STT conversion for converting a voice command uttered by a user into a text, thereby generating a text corresponding to the voice command.

The voice recognizing module 810 may refer, for example, to a module for converting a voice signal into a text, and employs various ASR algorithms to convert a voice signal into a text.

The voice recognizing module 810 may for example be embodied as included in the server 500 of a cloud form.

However, without limitations, the voice recognizing module 810 may be provided in the master apparatus, e.g., the first electronic apparatus 101 as described above, and thus make the first electronic apparatus 101 serve as the STT server. In this case, the processor 170 of the first electronic apparatus 101 may include the voice recognizing module embodied by one of hardware, software or combination thereof, and a STT obtained by converting the voice command into the text in the first electronic apparatus 101 may be transmitted together with the information of the apparatus corresponding to the voice command to the server 500.

The information of the voice command converted into the text in the voice recognizing module 810, in other words, the STT and the information of the apparatus corresponding to the voice command are transmitted to the domain identifying module 820.

According to an embodiment, the voice recognizing module 810 may extract one or more utterance elements from the voice command converted into the text, and transmit the extracted utterance element as the STT to the domain identifying module 820. The utterance element may refer, for example, to a keyword for performing an operation requested by a user in the voice command, and may for example include a first utterance element indicating a user action and a second utterance element indicating features.

According to an embodiment, the STT may be output as data of a previously defined format, for example, a JavaScript Object Notation (JSON) format, or the like.

The domain identifying module 820 may include various processing circuitry and/or executable program elements and recognize the STT of the voice command obtained from the voice recognizing module 810, and identify a category corresponding to a user's intention. The domain identifying module 820 may, for example, analyze at least one utterance element as the STT of the voice command, thereby identifying a category.

The domain identifying module 820 may include a domain classifier (DC) that, for example, employs a decision tree technique for the STT of the voice command, and classifies a rough category, in other words, a domain based on a user's intention.

According to an embodiment, the DC may perform primary read-out to classify rough content of the voice command by analyzing a pattern of the STT of the voice command, for example, one or more utterance elements. Based on a result of such primary read-out, the DC identifies a category of inquiry with respect to the received voice command, and thus identifies the corresponding category.

Each category may match one or more electronic apparatuses. For example, a weather category (or a weather domain) may match a TV, an air conditioner, and an air purifier. A news category (or a news domain) may match the TV. A broadcast program, a movie and the like image content category (or an image content domain) may match the TV.

According to an embodiment, the domain identifying module 820 may identify a category corresponding to a user's intention by recognizing the STT of the voice command obtained from the voice recognizing module 810, and select an apparatus matching the identified category from the apparatus list.

Based on a recognition result of the STT, the domain identifying module 820 transmits the STT of the voice command and the apparatus information to the intention analyzing module 830. The apparatus information may include at least one of the information about the representative apparatus, e.g., the master apparatus or the information about the target apparatus, e.g., the slave apparatus, as the information of the apparatus corresponding to the received voice command.

According to an embodiment, the STT of the voice command may be output as data of a previously defined format, for example, JSON format, or the like.

According to an embodiment, the STT of the voice command may be output as one or more utterance elements.

The intention analyzing module 830 may include a detailed intention analyzer (e.g., including processing circuitry and/or executable program elements) 831, a voice model (e.g., including processing circuitry and/or executable program elements) 832, and a response generator (e.g., including processing circuitry and/or executable program elements) 833.

According to an embodiment, the intention analyzing module 830 may, as shown in FIG. 10, be managed as classified according to categories, e.g., domains corresponding to a user's intention based on the recognition result of the STT, and include a detailed intention analyzer 831, a voice model 832, and a response generator 833 with respect to each domain.

Each domain may, as illustrated in FIG. 10, match one or more target apparatuses.

According to an embodiment where the intention analyzing module 830 is embodied to be managed as classified corresponding to a user's intention and according to target apparatuses, a plurality of domains, for example, a first domain, a second domain, a third domain, a fourth, . . . , the nth domain may be referred to, for example, as capsules, respectively.

Based on a STT recognition result, the domain identifying module 820 may transmit the STT of the voice command and the information of the apparatus to the detailed intention analyzer 831 provided corresponding to a domain corresponding to a category identified corresponding to a user's intention among a plurality of domains, for example, a second domain (or capsule).

According to an embodiment, as described above, the detailed intention analysis may be performed using the domains/capsules classified according to the target apparatuses, corresponding to a user's intention, and it is thus possible to increase efficiency in voice recognition based on a quick voice process and improve accuracy of voice recognition.

According to an embodiment, the detailed intention analyzer 831 may include various processing circuitry and/or executable program elements, including natural language understanding (NLU) to perform detailed analysis for the STT of the voice command.

The detailed intention analyzer 831 may be configured to grasp detailed intention with regard to the voice command using a voice model (or language model (LM)) provided for the corresponding domain (or capsule).

The response generator 833 may include various processing circuitry and/or executable program elements and generate a response signal (or response data) based on the analysis result of the detailed intention analyzer 831. The response signal may be output as a previously defined format, for example, the JSON format, or the like.

The response signal may include a response message and a control instruction for the target apparatus. The control instruction may include a control instruction of an apparatus corresponding to a category classified according to a user's intention based on the STT recognition result of the received voice command.

The response message and the control instruction may be included in single data having a predetermined format, or may be generated as separate data as necessary.

The response message may include an audio signal corresponding to a sound output as a process result of the voice command through the loudspeaker 150, 250 or an image, for example, a GUI displayable on the display 110, 210.

The sound/image given as the response message may be output through the loudspeaker 150/the display 110 of the representative apparatus, e.g., the first electronic apparatus 101, or may be output through the loudspeaker 250/the display 210 of the target apparatus, e.g. the second electronic apparatus 102 as necessary.

The sound/image is output through the loudspeaker 150/the display 110 of the representative apparatus, e.g., the first electronic apparatus 101 even though the target apparatus does not have the loudspeaker/the display.

The response generator 833 may include various processing circuitry and/or executable program elements, including a user interface (UI) layout module configured to transmit a response signal including a response message optimized for the output types of an apparatus that corresponds to a voice command, in other words, the representative apparatus that receives the voice command, or the target apparatus that performs an operation corresponding to the voice command. The UI layout module makes the response message to the voice command be generated suitable for a category of inquiry and the target device According to an embodiment, the response generator 833 may generate a response message having a format corresponding to a message output format of the representative apparatus, e.g., the first electronic apparatus 101.

For example, when the representative apparatus is a TV, the response message may include a GUI displayable on the display 110 and a sound to be output through the loudspeaker 150. When the representative apparatus is an AI loudspeaker, the response message may include a sound.

According to an embodiment, the response generator 833 may generate a response message corresponding to the message output format of the target apparatus. In this case, the representative apparatus may serve to receive a response message from the server 500 and deliver the response message to the target apparatus.

The response signal including the response message and the control instruction may be output together with the apparatus information to the master apparatus, e.g., the first electronic apparatus 101. The apparatus information may include the identification information about the target apparatus.

Therefore, as shown in FIG. 8, the processor 170 of the first electronic apparatus 101 designated as the master apparatus may receive the response signal of the voice command from the server 500 through the interface circuitry 120 (702). The received response signal may include the response message and the control instruction.

The processor 170 may control the response message included in the response signal received in the operation 702 to be output through at least one of the apparatus corresponding to the voice command, in other words, the target apparatus carrying out the operation corresponding to the voice command or the representative apparatus receiving the voice command (703).

For example, when the response message includes an audio signal, the processor 170 may extract the audio signal from the response message and output a sound corresponding to the extracted audio signal through the loudspeaker 150 of the first electronic apparatus 101 designated as the representative apparatus. Further, when the response message includes a video signal, the processor 170 may extract the video signal from the response message and display an image, e.g. a GUI corresponding to the extracted video signal on the display 110 of the first electronic apparatus 101 designated as the representative apparatus.

The processor 170 may control the target apparatus to perform an operation based on the control instruction included in the response signal received in the operation 702 (704).

According to an embodiment, when the target apparatus is the master apparatus, the first electronic apparatus 101 may perform a control operation based on the received control instruction. In other words, the processor 170 may extract a control instruction from the response signal, and perform an operation based on the extracted control instruction.

According to an embodiment, when the target apparatus is the slave apparatus, the first electronic apparatus 101 extracts a control instruction from the received response signal, and transmit the extracted control instruction to the target apparatus through the interface circuitry 120.

According various example embodiments, the representative apparatus receives the response signal including the response message and the control instruction from the server 500, and the target apparatus performs an operation based on the control instruction. However, as necessary, the target apparatus according to the disclosure may be embodied to directly receive the response message or the control instruction from the server 500. In other words, an embodiment may include a case where the representative apparatus receives the voice command on behalf of the target apparatus, but the response signal generated by analyzing the voice command is directly transmitted to the target apparatus.

Figure 11:
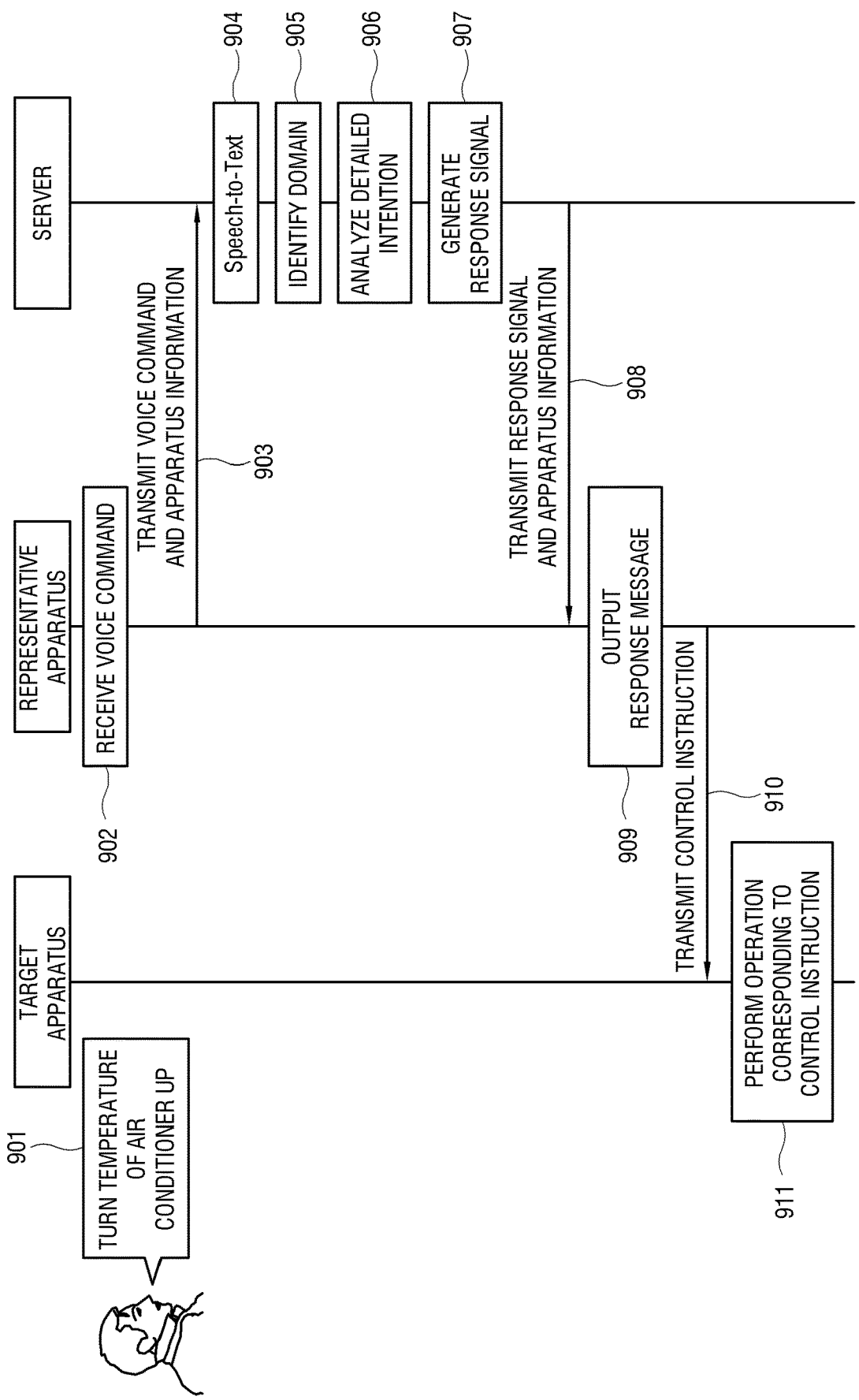
FIG. 11 is a signal flow diagram illustrating example control operations based on a voice command according to various embodiments.

FIG. 11 is a signal flow diagram illustrating example control operations based on a voice command according to various embodiments.

As shown in FIG. 11, a user may utter a voice command 901 targeted for one among the plurality of electronic apparatuses 101, 102, 103 and 104.

In the embodiment shown in FIG. 11, it will be described on the assumption that the plurality of electronic apparatuses 101, 102, 103 and 104 may be placed in the first area, for example, the living room at home, in which the first electronic apparatus 101, e.g., the TV is designated as the representative apparatus (e.g., the master apparatus), and the other electronic apparatuses 102, 103 and 104 are designated as the slave apparatus.

There are no limits to the content of the voice command 901 uttered by a user. For example, as shown in FIG. 11, when a voice command of "turn the temperature of the air conditioner up" is issued, the target apparatus may be the second electronic apparatus 102, e.g., the air conditioner. When a voice command of "let me know movie channels" is issued, the target apparatus may be the first electronic apparatus 101, e.g., the TV. In other words, embodiments involve both the case where the target apparatus is the same as the representative apparatus and the case where the target apparatus and the representative apparatus are different from each other.

In FIG. 11, the uttered voice command 901 may be received in the microphone 140 of the representative apparatus, e.g., the first electronic apparatus 101 (902).

The representative apparatus, in other words, the first electronic apparatus 101 may transmit the received voice command and the apparatus information to the server 500 (903). The apparatus information may for example include a list of grouped apparatus including a master and slaves. At least one of the identification information of the representative apparatus, e.g., the first electronic apparatus 101 or the identification information of the target apparatus, e.g., the second electronic apparatus 102 may be transmitted to the server 500.

The server 500 may generate a text by applying the STT to the voice command received from the representative apparatus, e.g., the first electronic apparatus 101 (904). Such STT may be performed by the voice recognizing module 810 embodied to include an ASR engine.

The embodiment shown in FIG. 11 illustrates that the STT is implemented in the server 500, but this is merely an example. According to an embodiment, the first electronic apparatus 101 may serve as the STT server. In this case, the STT may be implemented in the representative apparatus, e.g., the first electronic apparatus 101, and the information of the voice command converted into the text may be transmitted from the first electronic apparatus 101 to the server 500.

The server 500 may identify a category, in other words, a domain corresponding to a user's intention, based on information of the voice command converted into the text, e.g., the STT (905). The identification of the category/the domain may be performed by the domain identifying module 820 including a domain classifier (DC).

The server 500 may control the intention analyzing module 830 to perform a detailed intention analysis based on the STT of the voice command with respect to the category, in other words, the domain identified corresponding to a user's intention (906). Such detailed intention analysis is provided with respect to the corresponding domain (or capsule) to grasp detailed intention to the STT of the voice command, which may be achieved by the detailed intention analyzer 831 including natural language understanding (NLU) with reference to a corresponding language model (LM) 832.

The server 500 may generate a response signal based on the detailed intention analysis with respect to the voice command (907). The generation of the response signal may be carried out by the response generator 833 including the UI layout module for transmitting the optimized response signal corresponding to the output method of the representative apparatus or the target apparatus. The generated response signal may include at least one of the response message and the control instruction.

The response message may correspond to a message output method of at least one of the apparatus corresponding to the voice command, in other words, the target apparatus carrying out an operation corresponding to the voice command or the representative apparatus receiving the voice command. In the embodiment of FIG. 11, the type of the response message may correspond to the message output method of the representative apparatus receiving the voice command.

The server 500 may transmit the response signal together with the apparatus information to the representative apparatus, in other words, the first electronic apparatus 101 (908).

The representative apparatus, in other words, the first electronic apparatus 101 may output the response message (910).

According to an embodiment, when the representative apparatus, e.g., the first electronic apparatus 102 is a TV, the response message may include a video signal to be displayed on the display 110 and an audio signal to be output through the loudspeaker 150.

For example, as shown in FIG. 11, when a voice command of "turn the temperature of the air conditioner up" is uttered, a GUI showing that the corresponding command was delivered to the air conditioner may be displayed on the display 110 of the first electronic apparatus 101 and a sound of "the command was delivered to the air conditioner" or "the setting temperature of the air conditioner will be changed to 00" may be output through the loudspeaker 150 as the response message.

The first electronic apparatus 101 designated as the representative apparatus may transmit the control instruction included in the response signal to the apparatus, e.g., the target apparatus which will follow the control instruction (910). The first electronic apparatus 101 may extract the control instruction from the received response message, and transmit the extracted control instruction to the target apparatus, e.g., the second electronic apparatus 102.

The control instruction may include a control code capable of controlling the operation of the target apparatus, for example, the second electronic apparatus 102. For example, the control instruction may include a control code for controlling the second electronic apparatus 102 designated as the target apparatus, for example, the air conditioner to perform a corresponding operation.

The second electronic apparatus 102 designated as the target apparatus may perform the operation corresponding to the received control instruction (911). For example, the second electronic apparatus 102 designated as the target apparatus, for example, the air conditioner may receive a control instruction and increase its setting temperature as a corresponding operation based on the control instruction.

As described above, according to an embodiment, the plurality of electronic apparatuses 101, 102, 103 and 104 may be grouped, and the representative apparatus 101 receives a voice uttered by a user and controls the target apparatus 102 to operate based on the voice, thereby improving convenience of a user because even the electronic apparatus having no voice input functions is controllable with the voice command.

Further, the response message is output through the representative apparatus 101, and it is advantageously possible to give feedback on the voice command, which is issued to the target apparatus that does not include the display or the loudspeaker, to a user.

Further, the microphone of the apparatus(es) other than the representative apparatus 101 within one area becomes inactivated, thereby preventing and/or reducing confusion caused as the plurality of apparatuses having the microphones from simultaneously responding to the voice uttered by a user.

Further, the detailed intention analysis for the voice command is performed using the domains/capsules classified according to the target apparatuses, corresponding to a user's intention, and it is thus possible to increase efficiency in voice recognition based on a quick voice process and improve accuracy of voice recognition.

According to an embodiment, a method according to various embodiments may be provided as a computer program product. The computer program product may be traded as goods a commodity between a seller and a purchaser. The computer program product may be distributed in the form of a machine-readable storage medium (e.g. a compact disc read only memory (CD-ROM)), or may be distributed (e.g. downloaded or uploaded) directly between two user devices (e.g. smartphones) through an application store (e.g. The Play Store™) or through the Internet. In a case of the Internet distribution, at least a part of the computer program product (e.g. a downloadable app) may be at least transitorily stored or temporarily generated in a machine-readable storage medium such as a server of a manufacturer, a server of the application store, or a memory of a relay server.

As described above, according to an embodiment, a plurality of electronic apparatuses may be grouped, and a representative apparatus may receive a voice and controls a target apparatus to operate based on the voice, thereby improving convenience of a user because even the electronic apparatus having no voice input functions is controllable with a voice command.

Further, microphones of apparatuses other than a representative apparatus within one area become inactivated, and thus the plurality of apparatuses having the microphones are prevented from and/or avoid simultaneously responding to a voice as unintended by a user when the user utters the voice, thereby making the user free from inconvenience caused by confusion or misrecognition.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic apparatus comprising:
   interface circuitry;
   a display;
   a speaker; and
   a processor configured to control the electronic apparatus to:
   receive a user voice input;
   based on receiving the user voice input, control the interface circuitry to transmit, to a server, information of the received user voice input, a type of the electronic apparatus, and at least one external electronic apparatus in communication with the electronic apparatus, the information of the type of the electronic apparatus including information on whether the electronic apparatus includes at least one of the display or the speaker;
   receive, from the server through the interface circuitry, control data corresponding to the user voice input for the at least one external electronic apparatus and response data corresponding to the type of the electronic apparatus among a plurality of types, the response data being related with the control data;
   transmit the received control data to the at least one external electronic apparatus through the interface circuitry; and
   based on the received response data, control at least one of the display to display an image or the speaker to provide a sound.

2. The electronic apparatus according to claim 1, wherein the processor is configured to designate the at least one external electronic apparatus among a plurality of external apparatuses connectable through the interface circuitry as a representative apparatus.

3. The electronic apparatus according to claim 2, wherein the processor is configured to designate the representative apparatus based on an input.

4. The electronic apparatus according to claim 2, wherein the processor is configured to designate the representative apparatus based on an input to a graphic user interface (GUI) displayed on the display.

5. The electronic apparatus according to claim 2, wherein the processor is configured to designate the representative apparatus in each of at least one area.

6. The electronic apparatus according to claim 2, wherein the processor is configured to control the electronic apparatus to activate a microphone of the representative apparatus and inactivate a microphone of apparatuses other than the representative apparatus.

7. The electronic apparatus according to claim 6, wherein the processor is configured to control the electronic apparatus to receive the user voice input through the activated microphone.

8. The electronic apparatus according to claim 1, wherein a type of the response data corresponds a data output type of the electronic apparatus corresponding to the user voice input.

9. The electronic apparatus according to claim 1, wherein the control data includes identification information of the at least one external electronic apparatus.

10. The electronic apparatus according to claim 1, wherein the control data includes the control data for an external apparatus matching a category classified by a user's intention based on a recognition result from speech-to-text (STT) conversion of the received voice command.

11. The electronic apparatus according to claim 10, wherein the processor is configured to control the electronic apparatus to: obtain a text based on the STT conversion of the received voice signal and transmit the obtained text to the server.

12. The electronic apparatus according to claim 1, wherein the processor is configured to control the electronic apparatus to: receive information, that the electronic apparatus among the electronic apparatus and the at least one external electronic apparatus is designated as a representative apparatus, from an external apparatus through the interface circuitry.

13. A method of controlling an electronic apparatus including interface circuitry, a display, a speaker, and a processor, the method comprising:
receiving a user voice input;
based on receiving the user voice input, transmitting, to a server through the interface circuitry, information of the received user voice input, a type of the electronic apparatus, and at least one external electronic apparatus in communication with the electronic apparatus, the information of the type of the electronic apparatus including information on whether the electronic apparatus includes at least one of the display or the speaker;
receiving, from the server through the interface circuitry, control data corresponding to the user voice input for the at least one external electronic apparatus and response data corresponding to the type of the electronic apparatus among a plurality of types, the response data being related with the control data;
transmitting the received control data to the at least one external electronic apparatus through the interface circuitry; and
based on the received response data, controlling at least one of the display to display an image or the speaker to provide a sound.

14. The method according to claim 13, further comprising designating the at least one external electronic apparatus among a plurality of external apparatuses connectable through the interface circuitry as a representative apparatus.

15. The method according to claim 14, wherein the designating the electronic apparatus as the representative apparatus is based on an input or an input to a graphic user interface (GUI) displayed on the display.

16. The method according to claim 14, wherein the designating the electronic apparatus as the representative apparatus includes designating the representative apparatus in each of at least one area.

17. The method according to claim 14, further comprising activating a microphone of the representative apparatus and inactivating a microphone of apparatuses other than the representative apparatus,
wherein the user voice input is received through the activated microphone.

18. The method according to claim 13, wherein a type of the response data corresponds a data output type of the electronic apparatus corresponding to the user voice input.

19. The method according to claim 13, wherein the control data includes identification information of the at least one external electronic apparatus.

20. The method according to claim 13, wherein the control data includes control data for an external apparatus matching a category classified by a user's intention based on a recognition result from speech-to-text (STT) conversion of the received voice command.

* * * * *